United States Patent
Schaffert et al.

(10) Patent No.: US 8,356,563 B2
(45) Date of Patent: Jan. 22, 2013

(54) SEED PLANTER WITH EQUALIZER ASSEMBLY

(76) Inventors: Paul E. Schaffert, Indianola, NE (US); Doug Shadley, Indianola, NE (US)

(*) Notice: Subject to any disclaimer, the term of this patent is extended or adjusted under 35 U.S.C. 154(b) by 54 days.

(21) Appl. No.: 12/341,978

(22) Filed: Dec. 22, 2008

(65) Prior Publication Data
US 2009/0235853 A1    Sep. 24, 2009

Related U.S. Application Data

(60) Provisional application No. 61/016,386, filed on Dec. 21, 2007, provisional application No. 61/118,217, filed on Nov. 26, 2008.

(51) Int. Cl.
*A01C 5/00* (2006.01)
*A01C 9/00* (2006.01)
*A01C 23/00* (2006.01)

(52) U.S. Cl. ........ 111/121; 111/164; 111/165; 111/167; 111/193; 111/195

(58) Field of Classification Search .................. 111/140, 111/128, 52, 135, 139, 120, 122, 149, 157–169, 111/190–196, 121; 172/518, 540–576, 579–605, 172/29, 31
See application file for complete search history.

(56) References Cited

U.S. PATENT DOCUMENTS

| | | | |
|---|---|---|---|
| 13,683 A | 10/1855 | McCormick |
| 35,510 A | 6/1862 | DeHaven |
| 122,299 A | 12/1871 | Wight et al. |
| 176,708 A | 4/1876 | Templin |
| 203,207 A | 4/1878 | Springer |
| 211,601 A | 1/1879 | Springer |
| 252,265 A | 1/1882 | Scofield |
| 288,661 A | 11/1883 | Purdy et al. |
| 308,327 A | 11/1884 | Runstetler |
| 322,841 A | 7/1885 | Miskimen |
| 555,897 A | 3/1896 | Crane |
| 889,947 A | 6/1908 | Miller |

(Continued)

FOREIGN PATENT DOCUMENTS

DE    3321490    12/1984

(Continued)

OTHER PUBLICATIONS

Author Unknown, "1200 Series Advanced Seed Meter Planters," Case Iil, pp. 1-35, 2005.

(Continued)

*Primary Examiner* — Christopher J. Novosad
(74) *Attorney, Agent, or Firm* — Dorsey & Whitney LLP

(57) ABSTRACT

Disclosed herein is an agriculture planter. The planter may include a planter frame, a seed hopper and a trailing arm assembly. The planter frame may include a hitch tongue extending forwardly from the planter frame. The planter frame supports the seed hopper. The a trailing arm assembly is vertically pivotally coupled to a rear portion of the planter frame, extends rearward from the planter frame and includes a trailing arm frame and a lever arm vertically pivotally coupled to the trailing arm frame by a pivot point. The lever arm includes a leading end, a trailing end, a middle portion, a furrow opener disc and a first furrow closer wheel. The disc is rotatably mounted to the lever arm near the leading end. The first wheel is rotatably mounted to the lever arm near the trailing end. The middle portion is pivotably coupled to the pivot point.

11 Claims, 27 Drawing Sheets

U.S. PATENT DOCUMENTS

| | | | |
|---|---|---|---|
| 909,137 | A | 1/1909 | Bellerive |
| 1,473,297 | A | 11/1923 | Knight |
| 2,533,374 | A | 12/1950 | Hyland |
| 2,805,486 | A | 9/1957 | Barrett |
| 2,849,969 | A | 9/1958 | Taylor |
| 2,872,883 | A | 2/1959 | Padrick |
| 3,115,192 | A | 12/1963 | Bushmeyer |
| 3,336,885 | A | 8/1967 | Lebow |
| 3,599,729 | A | 8/1971 | Greemore |
| 3,895,589 | A | 7/1975 | Garner et al. |
| 4,108,089 | A | 8/1978 | van der Lely |
| 4,148,267 | A | 4/1979 | Bennett et al. |
| 4,253,412 | A | 3/1981 | Hogenson |
| 4,276,836 | A | 7/1981 | Pust |
| 4,294,181 | A | 10/1981 | Smith |
| 4,373,455 | A | 2/1983 | Friggstad |
| 4,542,705 | A | 9/1985 | Orth |
| 4,565,141 | A | 1/1986 | Kopecky |
| 4,580,507 | A | 4/1986 | Dreyer et al. |
| 4,607,581 | A | 8/1986 | Kopecky |
| 4,628,841 | A | 12/1986 | Powilleit |
| 4,671,193 | A | 6/1987 | States |
| 4,674,419 | A | 6/1987 | Kopecky |
| 4,911,090 | A | 3/1990 | Schimke |
| 5,078,528 | A | 1/1992 | Schmidt |
| 5,092,255 | A | 3/1992 | Long et al. |
| 5,361,848 | A | 11/1994 | Fleischer et al. |
| 5,375,542 | A | 12/1994 | Schaffert |
| 5,425,318 | A | 6/1995 | Keeton |
| 5,640,915 | A | 6/1997 | Schaffert |
| 5,673,638 | A | 10/1997 | Keeton |
| 5,730,074 | A | 3/1998 | Peter |
| 5,852,982 | A | 12/1998 | Peter |
| 5,884,711 | A | 3/1999 | Shoup |
| 5,904,107 | A | 5/1999 | Kester |
| 5,918,557 | A | 7/1999 | Schaffert |
| 5,996,514 | A | 12/1999 | Arriola et al. |
| 6,082,274 | A | 7/2000 | Peter |
| 6,082,275 | A | 7/2000 | Schaffert |
| 6,119,608 | A | 9/2000 | Peterson et al. |
| 6,148,747 | A | 11/2000 | Deckler et al. |
| D440,985 | S | 4/2001 | Noonan et al. |
| 6,209,466 | B1 | 4/2001 | Wodrich |
| 6,220,191 | B1 | 4/2001 | Peter |
| 6,283,050 | B1 | 9/2001 | Schaffert |
| 6,321,667 | B1 | 11/2001 | Shoup |
| 6,453,832 | B1 | 9/2002 | Schaffert |
| 6,530,334 | B2 | 3/2003 | Hagny |
| 6,763,773 | B2 | 7/2004 | Schaffert |
| 7,121,216 | B2 | 10/2006 | Schaffert |
| 7,360,495 | B1 | 4/2008 | Martin |
| 7,552,689 | B2 | 6/2009 | Schaffert |
| 7,581,503 | B2 * | 9/2009 | Martin et al. ............ 111/167 |
| 2002/0078869 | A1 * | 6/2002 | Brummelhuis .......... 111/140 |
| 2003/0051650 | A1 | 3/2003 | Engelke et al. |
| 2005/0072344 | A1 | 4/2005 | Kester |
| 2005/0155536 | A1 | 7/2005 | Wendte et al. |
| 2007/0113763 | A1 | 5/2007 | Schaffert |
| 2008/0011208 | A1 | 1/2008 | Martin |
| 2008/0066662 | A1 | 3/2008 | Hesla |
| 2009/0084295 | A1 | 4/2009 | Schaffert |

FOREIGN PATENT DOCUMENTS

| | | |
|---|---|---|
| DE | 3441610 | 5/1986 |

OTHER PUBLICATIONS

Author Unknown, "3000 Series Kinze Planters," pp. 3-6 and 12, 2003.
Author Unknown, "8000 Series Planters: Simply Advanced," White Planters, pp. 13-15, 2001.
Author Unknown, "Changing Planting Depth," 3 pages, at least as early as Dec. 21, 2007.
Author Unknown, "Cost-Effective Solutions for Real-World Needs," Yetter Profitable Solutions, pp. 1-27, at least as early as Dec. 21, 2007.
Author Unknown, "Dawn 1572/1500 Coulter Combo," 2 pages, Jul. 28, 2004.
Author Unknown, "Dawn Curvtine™ Closing Wheel," 2 pages, 1997.
Author Unknown, "Dawn Trashwheels Row Cleaner," 1 page, at least as early as Dec. 21, 2007.
Author Unknown, "Ferti-Placer," Schaffert Manufacturing Co., Inc., 2 pages, at least as early as Dec. 21, 2007.
Author Unknown, "Groff AG Improvements, LLC," 4 pages, at least as early as Dec. 21, 2007.
Author Unknown, "Hawkins Manufacturing Inc.," 1 page, at least as early as 2002.
Author Unknown, "Heavy-Duty Coulter," 3 pages, at least as early as Dec. 21, 2007.
Author Unknown, http://precision planting.com/html/keeton.html, 1 page, at least as early as Dec. 30, 2000.
Author Unknown, "Keeton Seed Firmer," J & K Enterprises, 1994.
Author Unknown, "Keeton Seed Firmer," Precision Planting, at least as early as Apr. 9, 2001.
Author Unknown, "Planter Fertilizer Attachments," Hawkins Manufacturing Inc., 4 pages, at least as early as Dec. 21, 2007.
Author Unknown, Photos Labeled "Photo A" and "Photo B", Oct. 17, 2007.
Author Unknown, "Seed to Soil Inforcer," Seed Flap, Spring 1995.
Author Unknown, "Sunco: Effectively Moves Trash in All Conditions!," 2 pages, at least as early as Dec. 21, 2007.
Author Unknown, "Sunco: Your Solution for Accurate Starter Fertilizer Placement," 2 pages, at least as early as Dec. 21, 2007.
Author Unknown, "Tine-Tooth Row Tillage Attachment," 9 pages, at least as early as Dec. 21, 2007.
Author Unknown, Tube Alignment Brackets, M & J Cotton Farms, Inc., at least as early as Oct. 30, 1995.
Author Unknown, "We Know It's All About Strong Roots," Yetter Profitable Solutions, pp. 1-27, at least as early as Dec. 21, 2007.
Author Unknown, "Yield-Pro Planters: Unsurpassed in form, function and safety," Great Plains, pp. 4, 5 and 10, at least as early as Dec. 21, 2007.
Author Unknown, "Yield-Pro Planters: Yield increasing row spacing options coupled with best in class productivity and accuracy," p. 7, at least as early as Dec. 21, 2007.
Finck, Charlene, "Where to start with starter fertilizer," Farm Journal, pp. 15-16, Jan. 1996.
Hawkins Mfg. Inc. Planter "N" Forcer Planter Fertilizer Attachments online product information description. Retrieved from http://www.hawkinsmfg.com/attachments.htm on Dec. 9, 2012. 2 pages.
US Application filed Mar. 23, 2012, U.S. Appl. No. 13/428,922, 136 pages.
Author Unknown, Brochure: The Precision Vacuum Planter, NG Plus Series, A.T.I., Inc. Monosem, Lenexa, Kansas, 3 pages, at least as early as Dec. 21, 2007.
Photo A of a gauge wheel arm, 1 page, at least as early as Dec. 21, 2007.
Photo B of a gauge wheel arm, 1 page, at least as early as Dec. 21, 2007.
Photo C of a gauge wheel arm, 1 page, at least as early as Dec. 21, 2007.
Photo D of a gauge wheel arm, 1 page, at least as early as Dec. 21, 2007.
Photo E of a gauge wheel arm, 1 page, at least as early as Dec. 21, 2007.
Photo F of a gauge wheel arm, 1 page, at least as early as Dec. 21, 2007.
Photo G of a gauge wheel arm, 1 page, at least as early as Dec. 21, 2007.

* cited by examiner

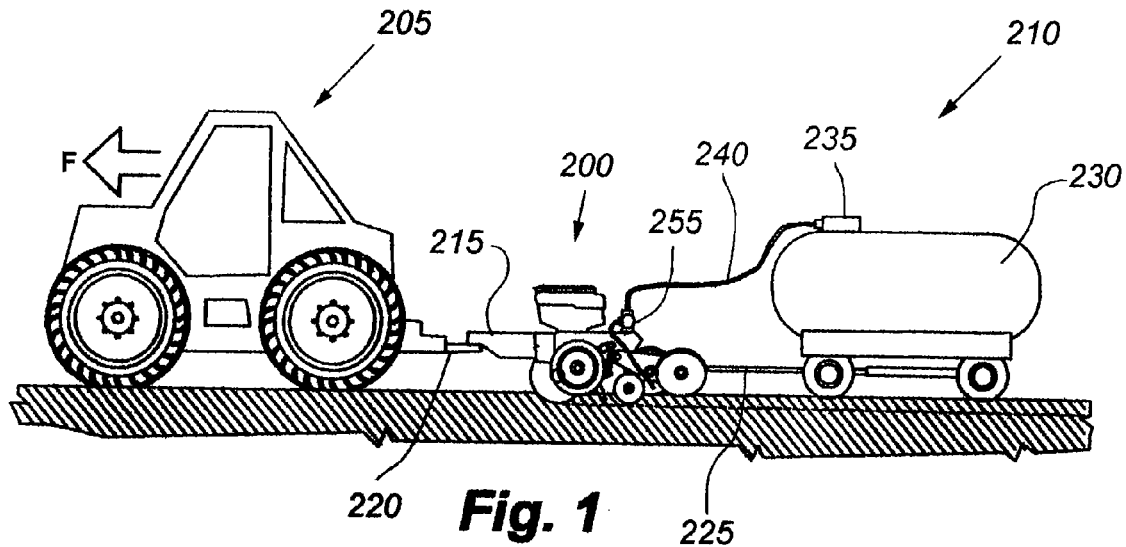

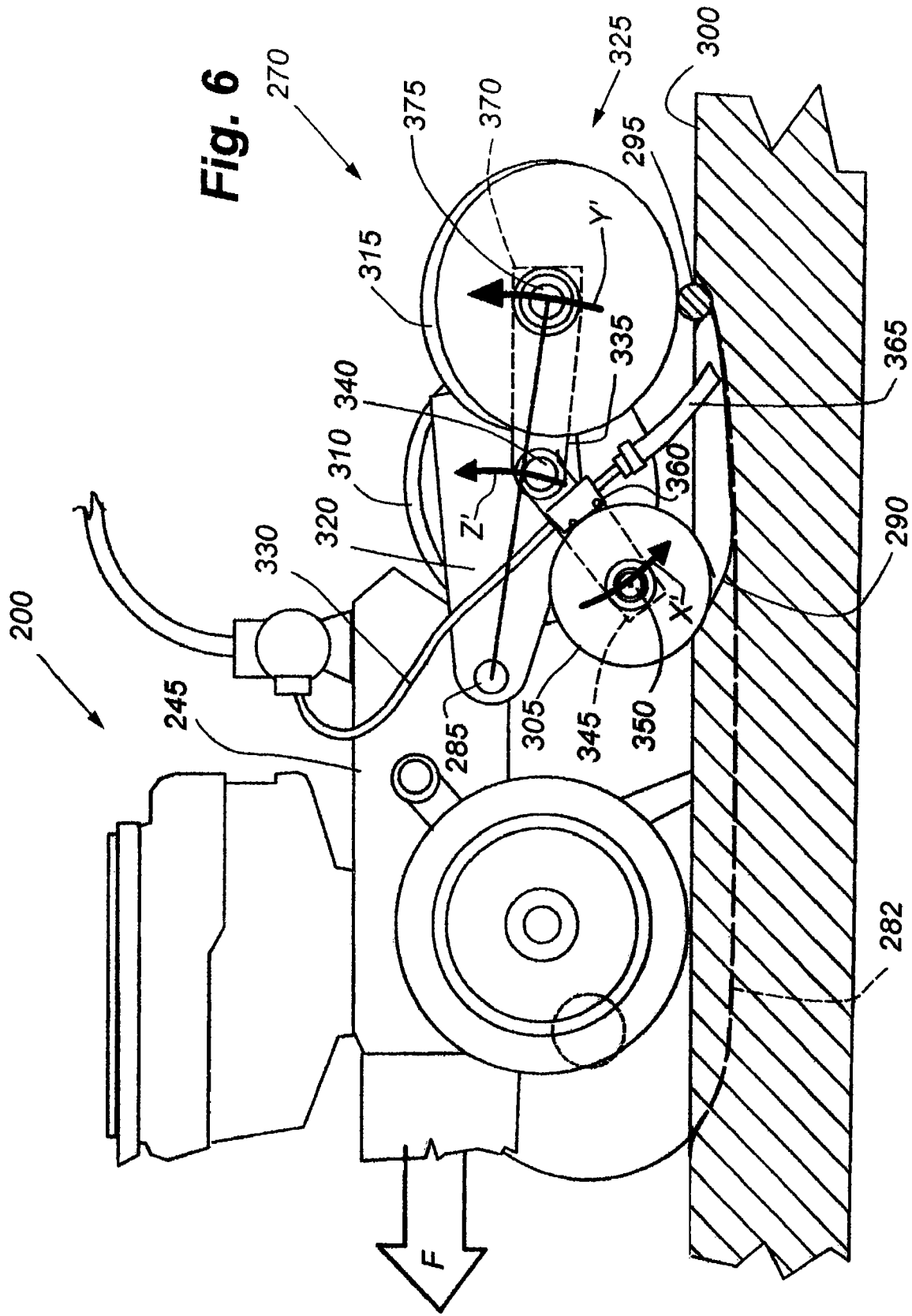

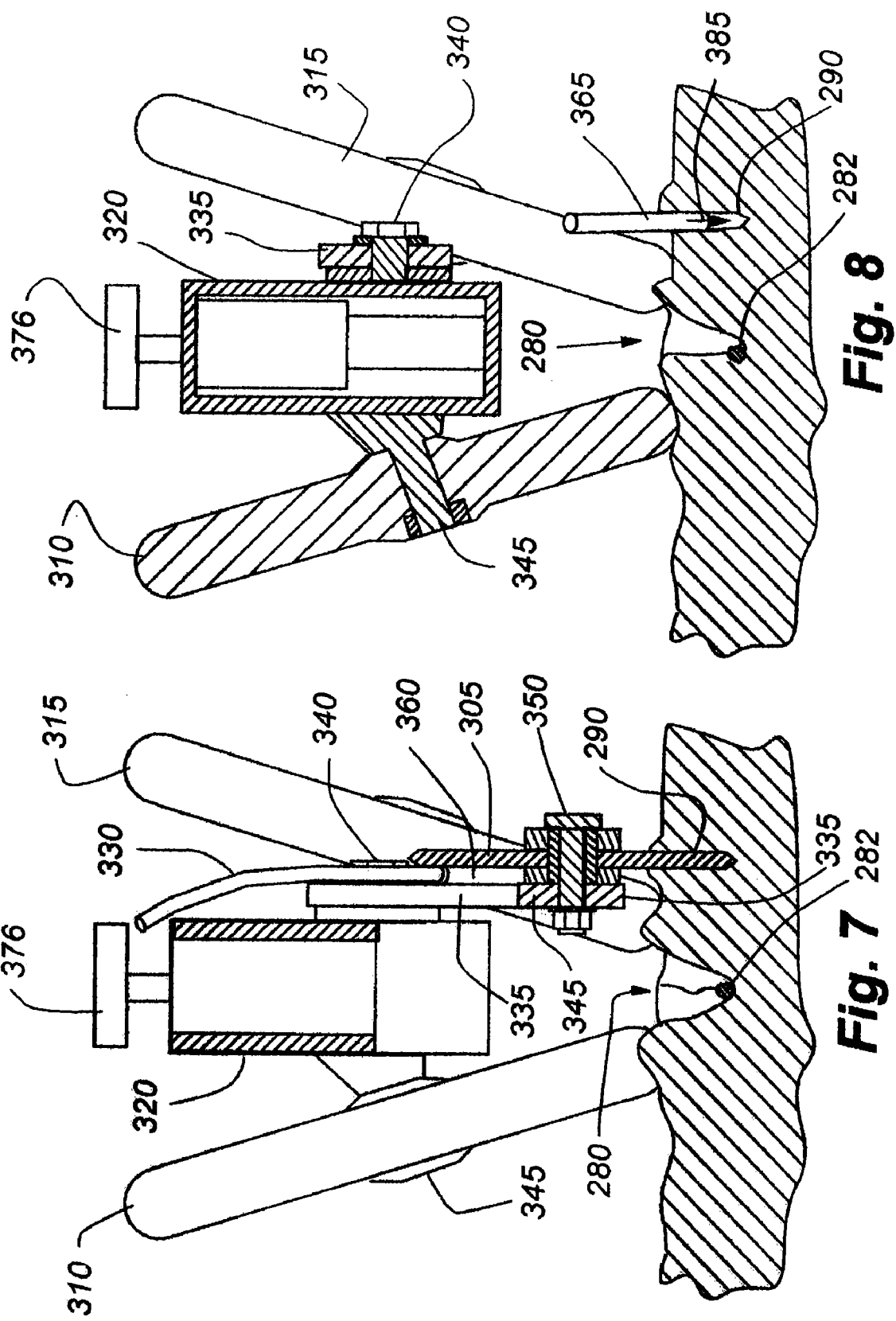

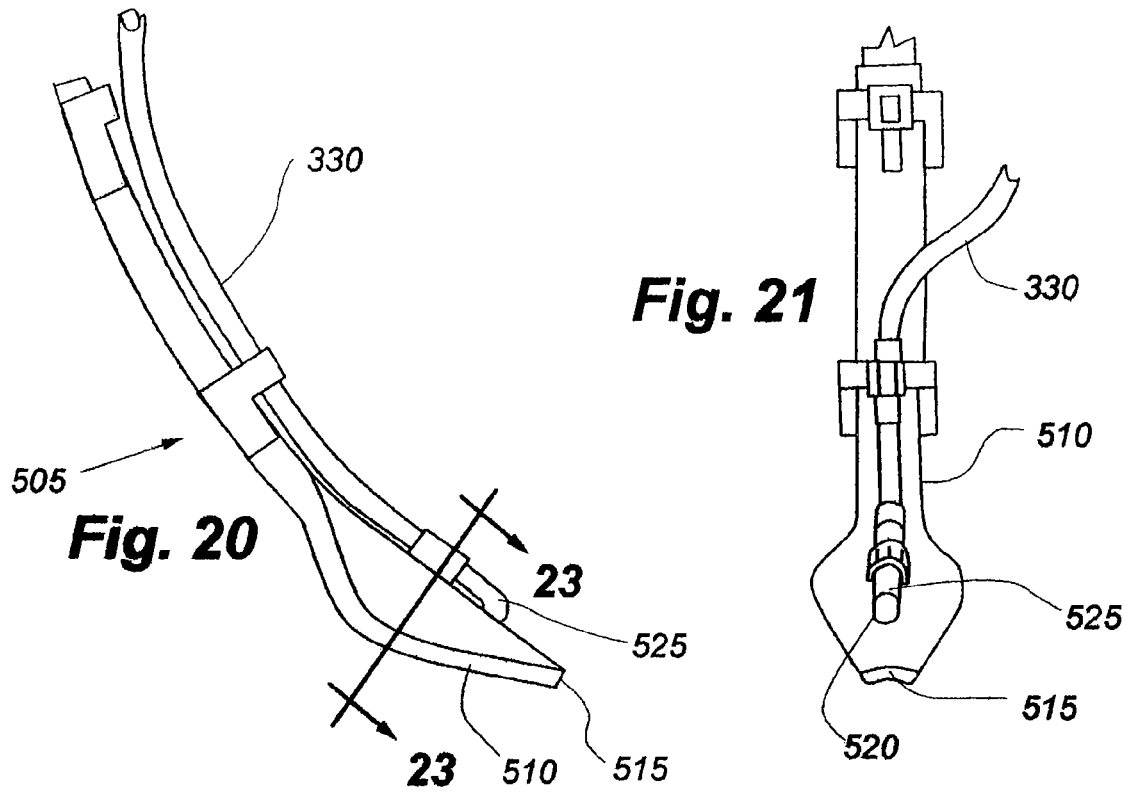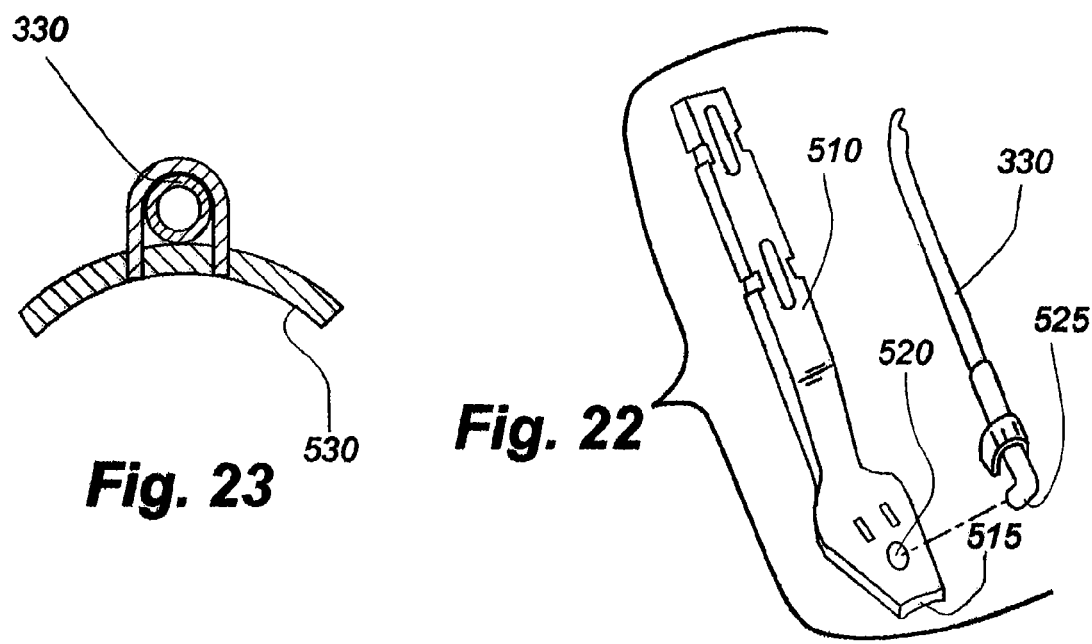

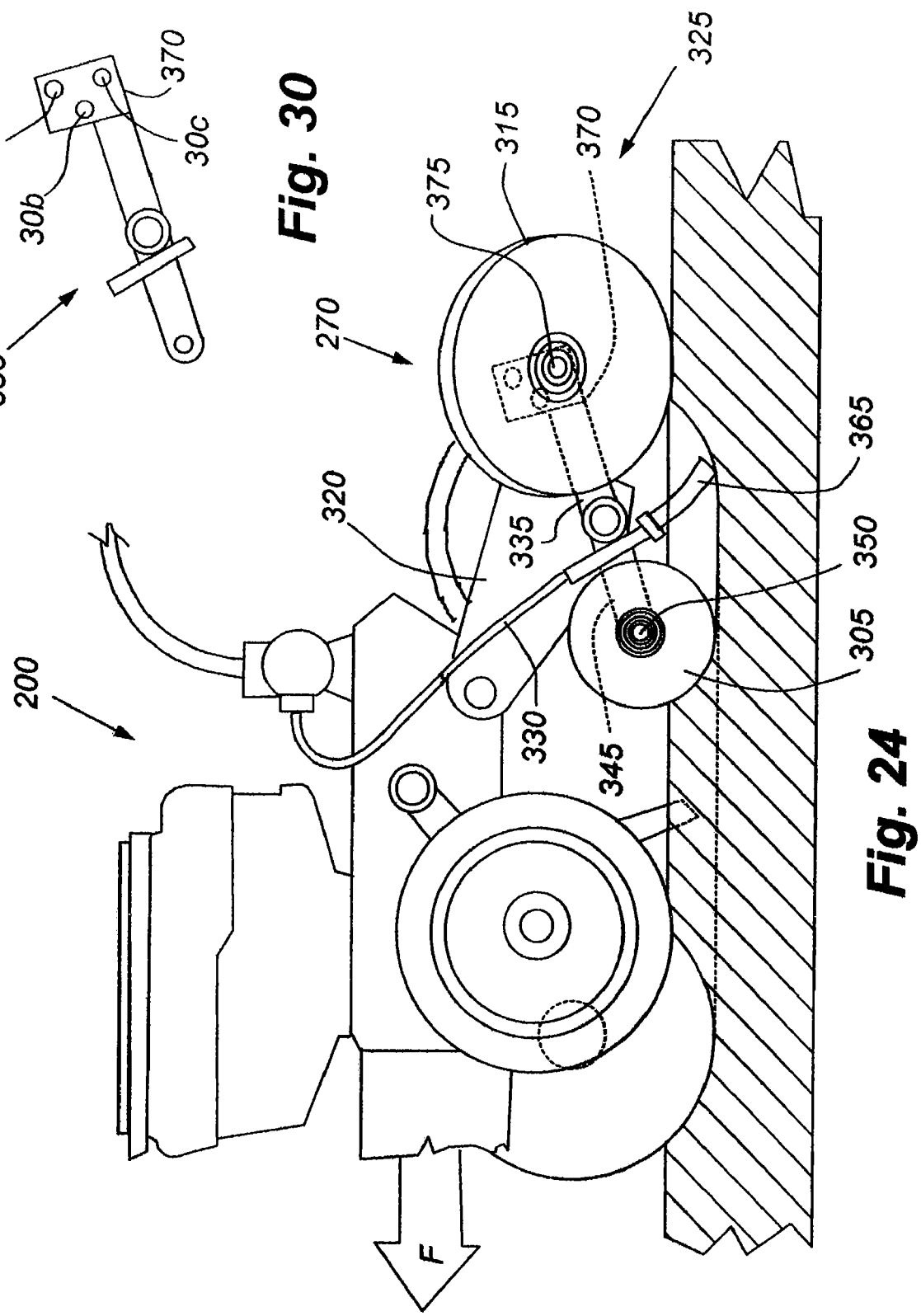

SEED PLANTER WITH EQUALIZER ASSEMBLY

CROSS-REFERENCE TO RELATED APPLICATIONS

This application claims priority pursuant to 35 U.S.C. §119 (e) to U.S. provisional patent application No. 61/118,217 filed 26 Nov., 2008 entitled "Seed Planter with Equalizer Assembly" and to U.S. provisional patent application No. 61/016,386 filed 21 Dec., 2007 entitled "Seed Planter with Equalizer Assembly," which are hereby incorporated by reference as if fully set forth herein.

FIELD OF THE INVENTION

The present invention relates to agricultural seed planters and drills. More specifically, the present invention relates to seed planters and drills that include apparatus adapted to properly place seeds in a seed furrow and further include liquid distribution apparatus for distributing liquids within the seed furrow.

BACKGROUND OF THE INVENTION

Agricultural seed planting is typically accomplished by multi-row planters. Each planter includes a plurality of row units adapted for opening a seed furrow, depositing seeds within the furrow, and closing the seed furrow around the seeds. In some cases, each row unit of the planter will also open a fertilizer furrow adjacent to each seed furrow, deposit liquid fertilizer in each fertilizer furrow, and close each fertilizer furrow.

Some planters are equipped or retrofitted to be equipped with fertilizer depositing equipment (e.g., fertilizer furrow opener discs and fertilizer deposit tubes) located on a leading or front side of the planter. Planters so configured can have problems in fields with moist or wet soil. Specifically, disturbing the soil with the fertilizer equipment located in front of the planter gage wheels can cause the moist or wet soil to accumulate on the gage wheels. The soil accumulation increases the effective diameters of the gage wheels and causes the planter to run too shallow with respect to the depositing of the seed in the seed furrows.

Planters are increasing in size, resulting in planters with sides or wings that fold upwardly and/or upwardly and forwardly. Locating the fertilizer depositing equipment on the front or leading end of the planter can result in a planter that is still overly large after being folded or incapable of being folded without the removal of the fertilizer depositing equipment.

Planters are increasingly used in no-till situations, resulting in the planter traversing fields with substantial deviation in the field surface and a substantial amount of obstructions (e.g., debris, clods, stubble, old furrows, etc.). Furthermore, in certain Midwest farm areas, ditches must be plowed in fields between planting seasons to facilitate the drainage of spring showers from the fields. Most planters have proven ineffective in such rough field surface conditions. It is not unusual for the use of planters in rough field conditions to result in seed depths that radically range between too deep and too shallow. Also, it is not unusual for the use of planters in such field conditions to result in the planter components being damaged.

There is a need in the art for a planter capable of providing liquid fertilizer in rough fields without adverse impact on seed depth and damage to planter components. There is also a need in the art for a planter capable of providing liquid fertilizer and still able to be folded without requiring removal of the fertilizer providing equipment.

SUMMARY OF THE INVENTION

Disclosed herein is an agriculture planter. In one embodiment, the planter includes a planter frame, a seed hopper and a trailing arm assembly. The planter frame includes a hitch tongue extending forwardly from the planter frame. The planter frame supports the seed hopper. The a trailing arm assembly is vertically pivotally coupled to a rear portion of the planter frame, extends rearward from the planter frame and includes a trailing arm frame and a lever arm vertically pivotally coupled to the trailing arm frame by a pivot point. The lever arm includes a leading end, a trailing end, a middle portion, a furrow opener disc and a first furrow closer wheel. The disc is rotatably mounted to the lever arm near the leading end. The first wheel is rotatably mounted to the lever arm near the trailing end. The middle portion is pivotably coupled to the pivot point.

Disclosed herein is an agriculture planter. In one embodiment, the planter includes a planter frame, a pivot point and a walking axle assembly. The pivot point is operably coupled to the planter frame. The walking axle assembly includes a lever arm, a furrow opening disc rotatably mounted on a leading end of the lever arm and a first furrow closing wheel rotatably mounted on a trailing end of the lever arm. A middle portion of the lever arm is vertically pivotally coupled to the pivot point.

Disclosed herein is an agriculture planter. In one embodiment, the planter includes a frame, a trailing arm assembly, a rotatable furrow-opening disc, and a first rotatable furrow-closing wheel. The trailing arm assembly is vertically pivotally coupled to a trailing side of the planter frame. The rotatable furrow-opening disc is operably coupled to the trailing arm assembly. The first rotatable furrow closing wheel is operably coupled to the to trailing arm assembly. Displacement of the first wheel relative to the trailing arm assembly causes displacement of the disc relative to the trailing arm assembly.

Disclosed herein is an agricultural planter. In one embodiment, the planter includes a frame, a pivot point and a walking axle assembly. The pivot point is operably coupled to the planter frame. The walking axle assembly includes a lever arm, where the lever arm may include a leading end, a trailing end a middle portion. Further, the lever arm may include a plurality of mounting positions and the middle portion of the lever arm is vertically pivotally coupled to the pivot point.

Disclosed herein is an agricultural planter. In one embodiment, the planter includes a frame, a pivot point and a walking axle assembly. The pivot point is operably coupled to the planter frame. The walking axle assembly includes a lever arm, where the lever arm includes at least a leading end, a trailing end and a middle portion. Further, the walking axle assembly includes a furrow opening disc rotatably mounted on a trailing end of the lever arm and a first furrow closing wheel rotatably mounted on a leading end of the lever arm. A middle portion of the lever arm is vertically pivotally coupled to the pivot point. In another embodiment, the furrow closing wheel may be rotatably mounted on a leading end of the lever arm, wherein the leading end of the lever arm may have a bracket with a plurality of mounting positions thereon. In yet another embodiment, the furrow closing wheel may be rotatably mounted on a trailing end of the lever arm, wherein the trailing end of the lever arm may have a mounting bracket with a plurality of mounting positions thereon.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the spirit and scope of the present invention. Accordingly, the drawings and detailed description are to be regarded as illustrative in nature and not restrictive.

BRIEF DESCRIPTION OF THE DRAWINGS

FIG. 1 is a side view of an agriculture tractor pulling an agriculture planter towing a liquid fertilizer tank trailer.

FIG. 2 is a top-rear isometric view of the planter.

FIGS. 3-6 are the same side views of the planter, each illustrating a different state of the gage wheel and components of the trailing arm assembly as the planter passes over an obstruction in the field surface.

FIG. 7 is a cross section of a furrow opener of the trailing arm assembly as taken along section line 7-7 in FIG. 3.

FIG. 8 is a cross section of a leading furrow closer of the trailing arm assembly as taken along section line 8-8 in FIG. 3.

FIG. 20 is a side view of the flexible concave member of the rebounder fertilizer assembly of FIGS. 18 and 19.

FIG. 21 is a view of the member of FIG. 20 as viewed from the same direction as FIG. 19.

FIG. 22 is an exploded isometric view of the member of FIG. 20 and the fertilizer tube.

FIG. 23 is a cross section through the concave member as taken along section line 23-23 in FIG. 20.

FIGS. 24-26 are the same side views of the planter, each illustrating a different mounting position of the furrow closer wheel with respect to the lever arm.

FIG. 30 is a side view of one embodiment of the lever arm.

FIG. 31 is a side view of another embodiment of the lever arm.

DETAILED DESCRIPTION

Figure 3:
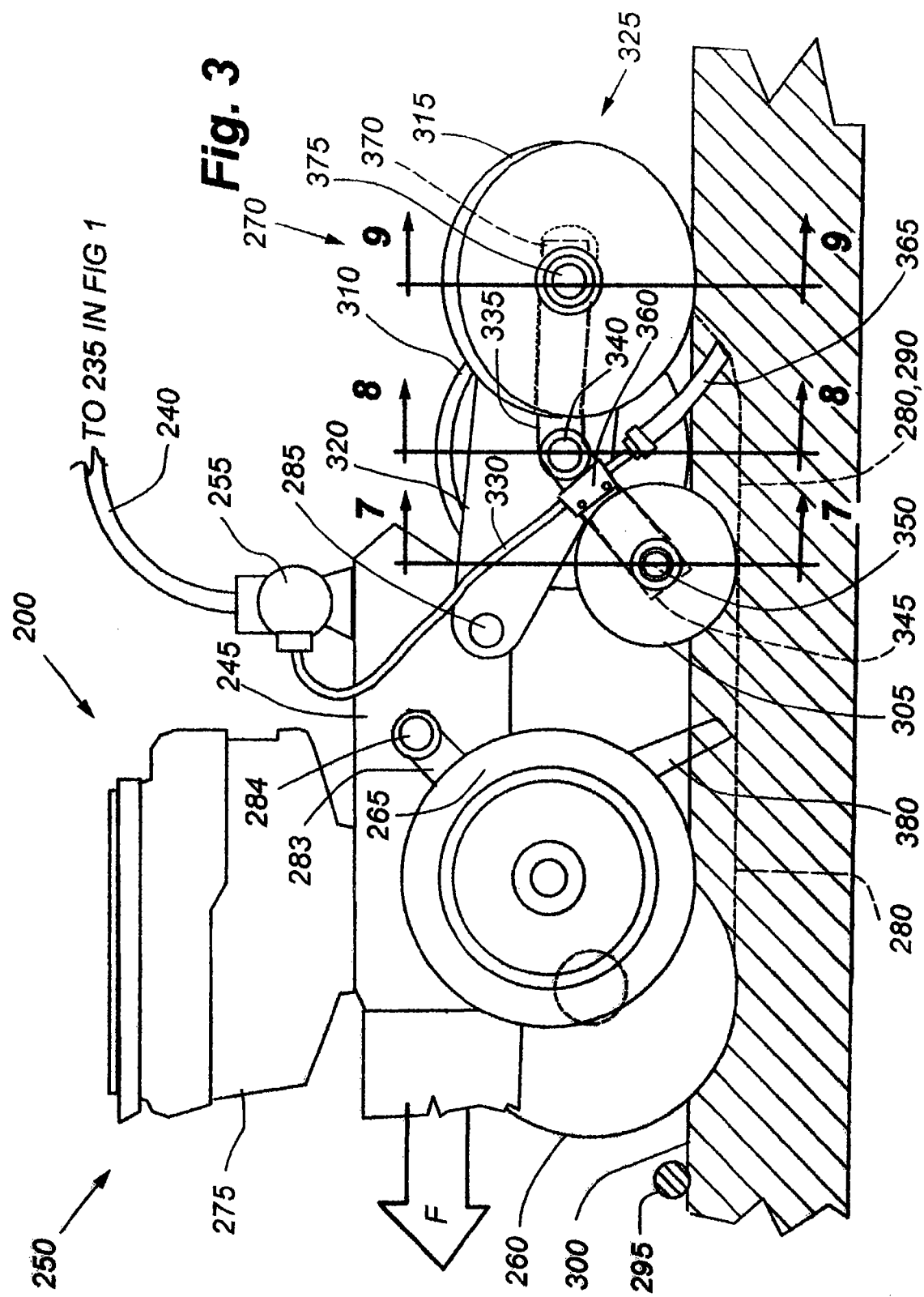

Disclosed herein, in at least one embodiment, is an agriculture planter 200 having a series of trailing arm assemblies 270 each equipped with a fertilizer furrow opener disc 305 and a trailing furrow closer wheel 315 mounted on a lever arm 335 to form a "walking axle" configuration or assembly 325. This configuration along with the location of the trailing arm assemblies 270 provides a number of advantages.

First, the walking axle assembly 325 allows the fertilizer furrow opener disc 305 and trailing furrow closer wheel 315 to follow the contours of the field, oscillating as the disc 305 and wheel 315 negotiate over or through an obstruction 295 in a field surface 300 without adversely impacting seed deposit depth or resulting in damage to the planter components. The ability of the disc 305 and wheel 315 to follow the contours of the field surface 300 facilitates: the disc 305 being in contact with the field surface 300 to open a fertilizer furrow 290; and the trailing furrow closer wheel 315 being in contact with the field surface 300 to close the seed and fertilizer furrows 280, 290.

Second, the ability of the walking axle assembly 325 to oscillate over variances in the field surface 300 allows the down pressure of the disc 305 and wheel 315 to balance between each other such that one or the other does not take all or substantially all of the downward pressure. In other words, the walking axle assembly 325 helps the disc 305 and wheel 315 to have relatively constant downward pressure, which avoids situations where one or the other takes a substantial portion of the downward pressure and causes the planter seed depth to become too shallow or too deep.

Third, the location of the walking axle assemblies 325 on the rear or trailing end of the planter 200 allows the planter 200 fold up without interference from the walking axle assemblies 325. Also, being located at the rear or trailing end of the planter 200 eliminates the issues with soil buildup on the gage wheels 265 caused by fertilizer equipment being located on the front or leading end of the planter 200.

For a detailed discussion of the planter 200 and its features, reference is made to FIGS. 1 and 2. FIG. 1 is a side view of an agriculture tractor 205 pulling the agriculture planter 200 towing a liquid fertilizer tank trailer 210. FIG. 2 is a top-rear isometric view of the planter 200.

As shown in FIG. 1, the planter 200 may include a tongue or hitch 215 for hitching the planter 200 to the hitch 220 of the tractor 205. The tractor 205 tows the planter 200 in the direction of arrow F and provides power to the planter 200 (e.g., via a power take off ("PTO")) for powering the operations of the planter 200.

As indicated in FIG. 1, the fertilizer trailer 210 may include a hitch 225 for coupling the trailer 210 to the rear of the planter 200, thereby allowing the trailer 210 to be towed behind the planter 200. The trailer 210 may include a tank 230 for holding liquid fertilizer and a pump 235 for pumping the fertilizer through a hose 240 extending between the tank 230 and the planter 200.

As illustrated in FIG. 2, the planter 200 may include a frame 245 from which the hitch 215 extends and the various planter components are supported. The various components of the planter 200 may include row units 250 and a liquid fertilizer distribution tube 255. The distribution tube 255 distributes the liquid fertilizer to the various row units 250.

Each row unit may include a furrow opener disc 260, a gage wheel 265, a trailing arm assembly 270, and a seed hopper 275. The seed furrow opener disc 260 creates a furrow 280 in which the planter 200 deposits seed 282 in a manner well known in the art. The gage wheel 265 assists in determining the depth at which the planter 200 deposits the seed. The gage wheel 265 is mounted to the frame 245 via a gage wheel lever arm 283, which is pivotally coupled to the frame 245 via a pivot pin 284. The seed hopper 275 serves as the seed reservoir for its row unit 250. The trailing arm assembly 270 may be pivotally coupled to the frame 245 via a pivot pin 285 and, as explained in the following discussion, may include components for opening a fertilizer furrow 290, delivering liquid fertilizer from the distribution tube 255 into the furrow 290, and closing the seed and fertilizer furrows 280, 290.

Figure 9:
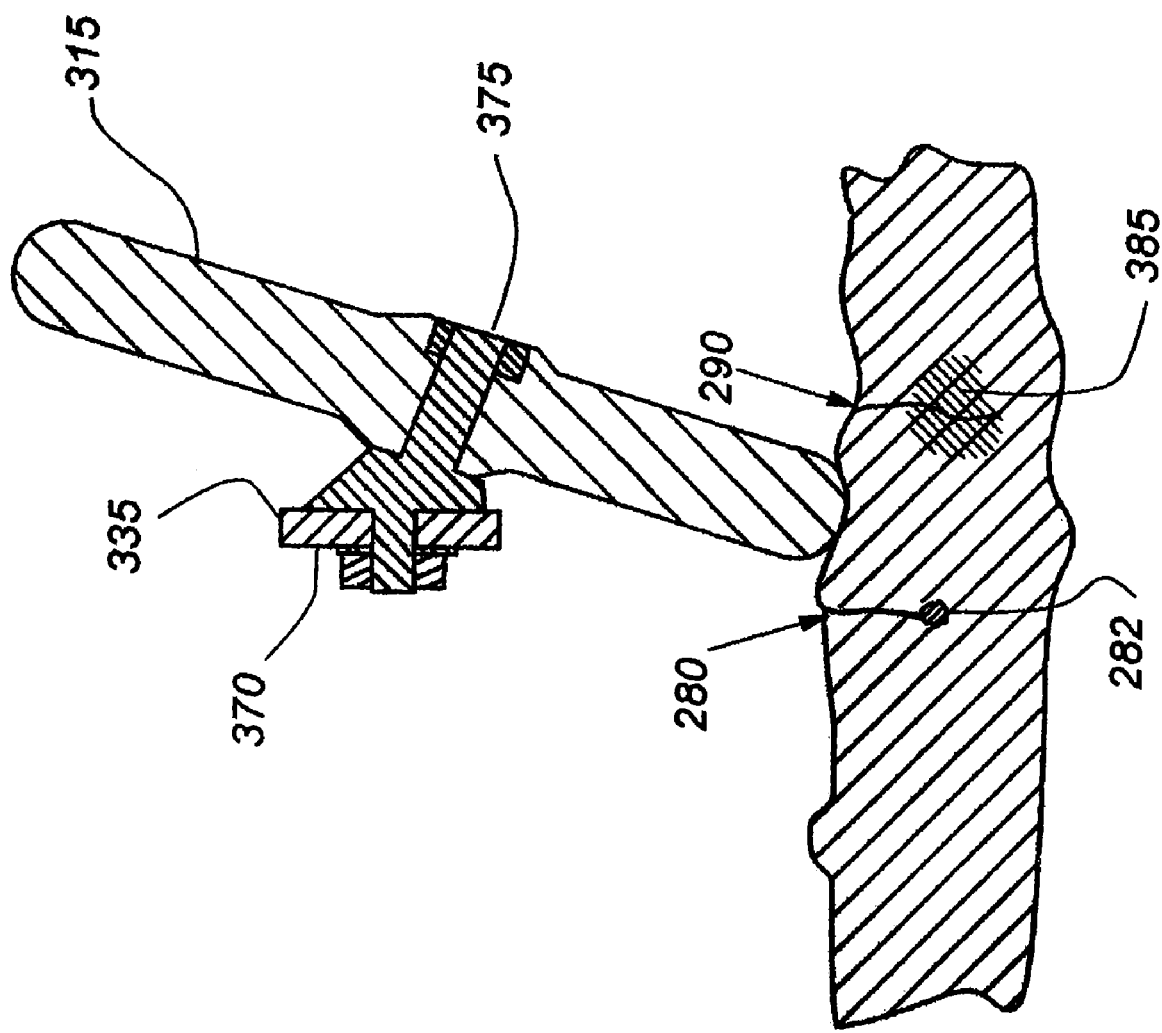
FIG. 9 is a cross section of a trailing furrow closer of the trailing arm assembly as taken along section line 9-9 in FIG. 3.

For a discussion of the various components of the trailing arm assembly 270 and the operation of those components, reference is made to FIGS. 3-9. FIGS. 3-6 are the same side views of the planter 200, each illustrating a different state of the gage wheel 265 and components of the trailing arm assembly 270 as the planter passes over an obstruction 295 in the field surface 300. FIG. 7 is a cross section of a fertilizer furrow opener disc 305 of the trailing arm assembly 270 as taken along section line 7-7 in FIG. 3. FIG. 8 is a cross section of a leading furrow closer wheel 310 of the trailing arm assembly 270 as taken along section line 8-8 in FIG. 3. FIG. 9 is a cross section of a trailing furrow closer wheel 315 of the trailing arm assembly 270 as taken along section line 9-9 in FIG. 3.

As depicted in FIG. 3, the trailing arm assembly 270 may include a trailing arm frame 320, the leading furrow closer wheel 310, a walking axle or lever arm assembly 325, and fertilizer deposit tube 330. The trailing arm frame 320 includes a pivot end pivotally coupled to the frame 245 via the pivot pin 285. The walking axle or lever arm assembly 325 includes a lever arm 335, the fertilizer furrow opener disc 305 and the trailing closer wheel 315.

As indicated in FIGS. 3 and 8, the lever arm assembly 325 is pivotally coupled to the trailing arm frame 320 via a pivot pin 340 extending through a middle portion of the lever arm 335. On the opposite side of the trailing arm frame 320, the leading furrow closer wheel 310 is pivotally coupled to the trailing arm frame 320 via a pivot pin 345, which is located generally directly opposite the pivot pin 340 of the lever arm 335. The leading closer wheel 310 may be tilted or inclined such that its pivotal axis is between approximately 13 degrees and approximately 25 degrees from being horizontal.

As shown in FIGS. 3 and 7, the fertilizer furrow opener disc 305 is pivotally coupled to the front or leading end 345 of the lever arm 335 via a pivot pin 350 extending through the lever arm 335. The fertilizer deposit tube 330 extends downwardly from the fertilizer distribution tube 255, through a bracket assembly 360 that couples the deposit tube 330 to the lever arm 335 slightly forward of the lever arm center pivot pin 340, and terminates in a flexible tubing 365, which may be separately replaceable from the rest of the deposit tube 330. The fertilizer deposit tube 330 may also extend through the flexible tubing 365 and may terminate at approximately the end of the flexible tubing 365. Additionally, the fertilizer deposit tube 330 may extend through the flexible tubing 365 and may terminate at any point within the flexible tubing 365. The flexible tubing 365 may be a polymer material reinforced or not reinforced with metal or other types of braiding. Candidate polymer materials may include polypropylene, ethyl vinyl acetate ("EVA"), ethylene propylene diene monomer rubber ("EPDM"), etc. Tubing 365 may not be flexible, but instead may be rigid.

As depicted in FIGS. 3 and 9, the trailing closer wheel 315 is pivotally coupled to the back or trailing end 370 of the lever arm 335 via a pivot pin 375 extending through the lever arm 335. The trailing closer wheel 315 may be tilted or inclined such that its pivotal axis is between approximately 13 degrees and approximately 25 degrees from being horizontal.

As indicated in FIGS. 2 and 7-8, in one embodiment, the trailing arm assembly 270 includes an adjustment lever 376. This lever 376 allows the down force exerted by the closer wheels 310, 315 to be adjusted. As is known in the art, a spring extends between a bottom end of the lever 376 and the planter main frame 245. The position of the lever 376 may be set to set the down force on the closing wheels 310, 315. When the lever 376 is in the forward position, the resulting down force on account of the spring is zero pounds, and when the lever 376 is the rearward position, the resulting force on account of the spring is at least 120 pounds.

Figure 11:
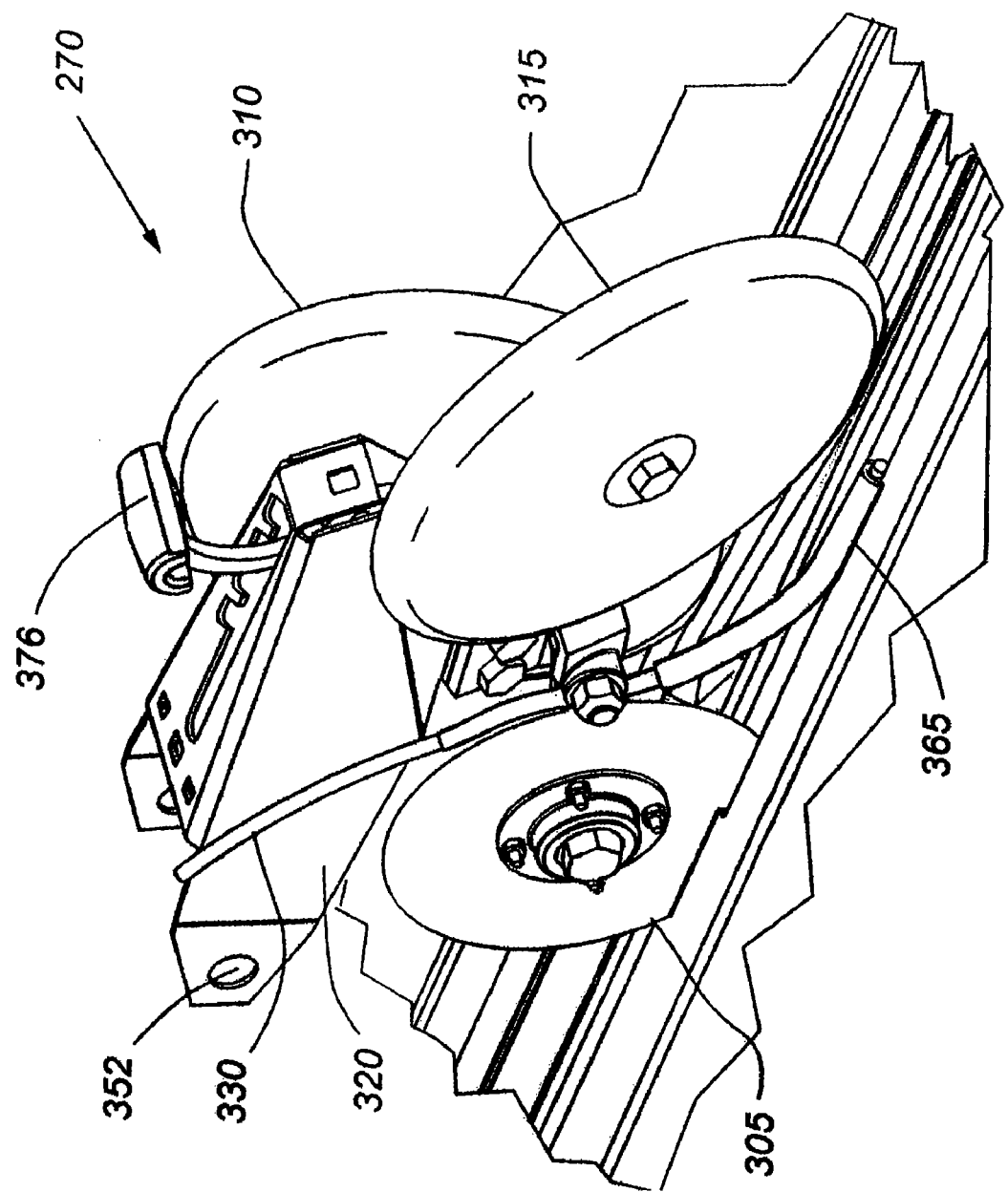
FIG. 11 is a rear isometric view of the trailing arm assembly similar to the viewing angle of FIG. 2, except the trailing arm is detached from the planter main frame.

FIG. 11 depicts one embodiment of the trailing arm assembly 270. FIG. 11 is a rear isometric view of the trailing arm assembly similar to the viewing angle of FIGS. 2 and 7-8, except the trailing arm assembly is detached from the planter main frame. Also similar to FIGS. 7 and 8, the adjustment lever 376 of FIG. 11 may adjust the down force exerted by the closer wheels 310, 315. Additionally, the trailing arm assembly 270 of FIG. 11 includes the liquid fertilizer distribution system, with the deposit tube 330 and the flexible tubing 365.

Figure 12:
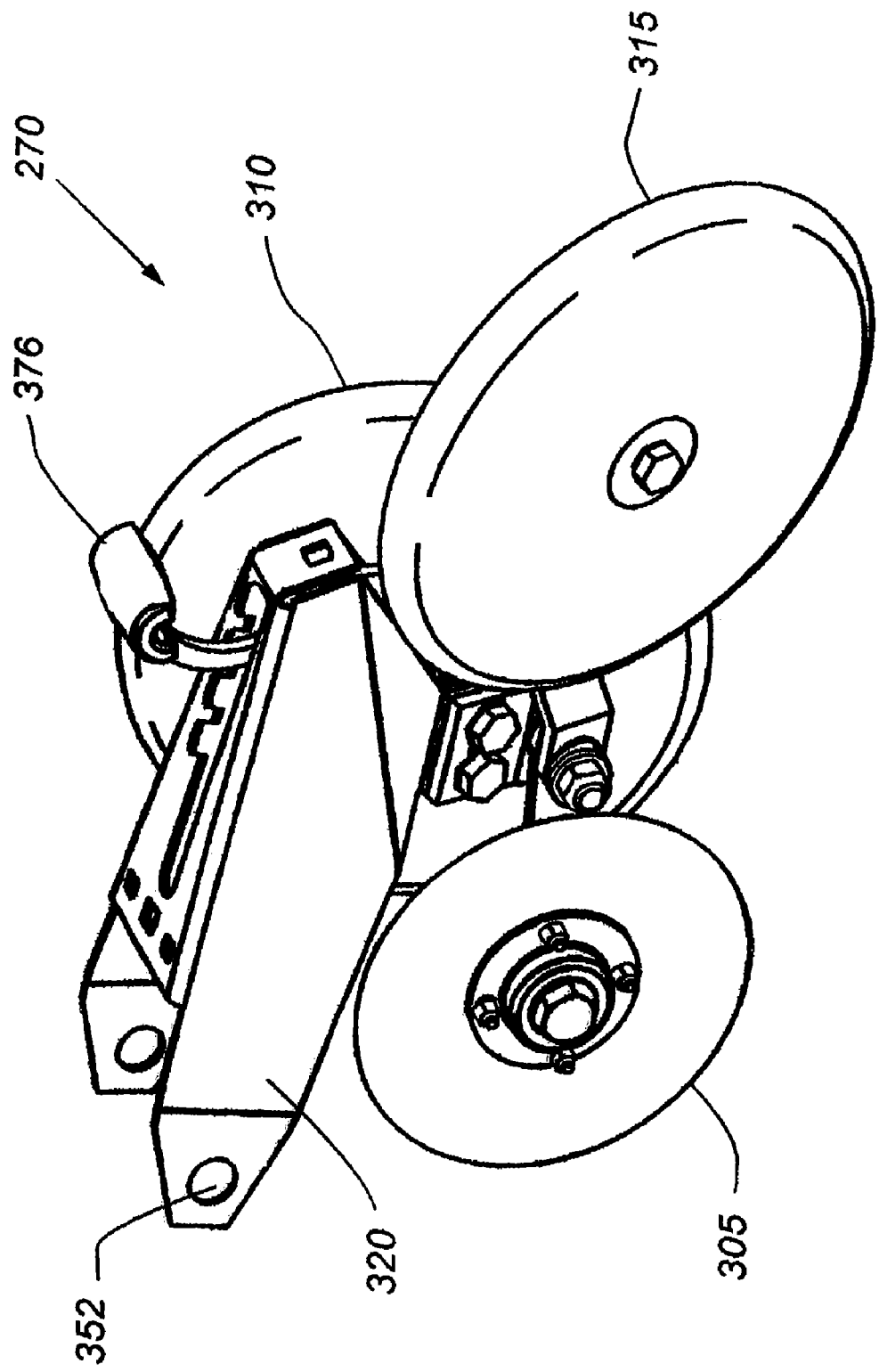
FIG. 12 is generally the same isometric view of the trailing arm depicted in FIG. 11, except the liquid fertilizer distribution system is not present.
Figure 13:
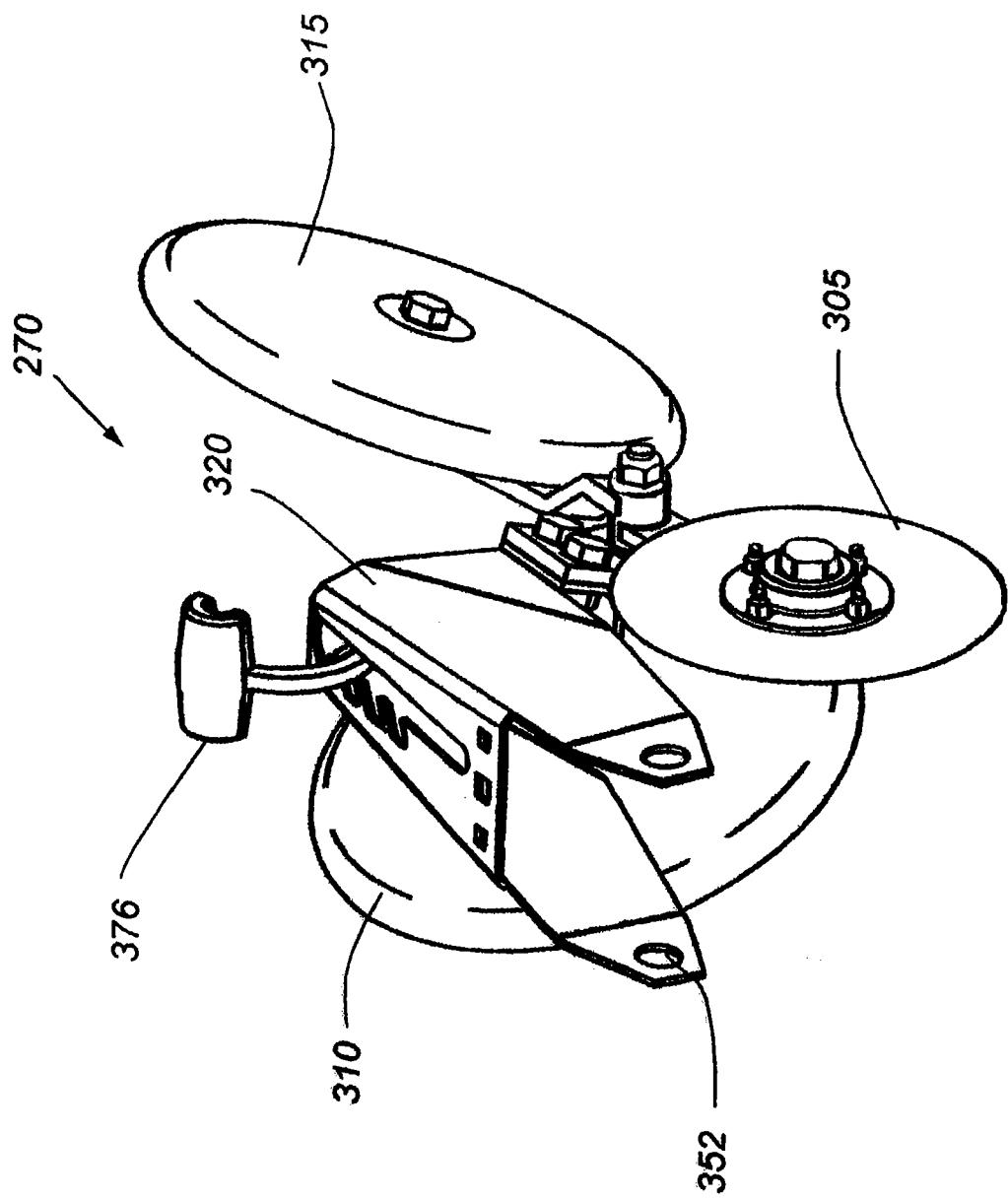
FIG. 13 is a front isometric view of the trailing arm assembly depicted in FIG. 12.
Figure 14:
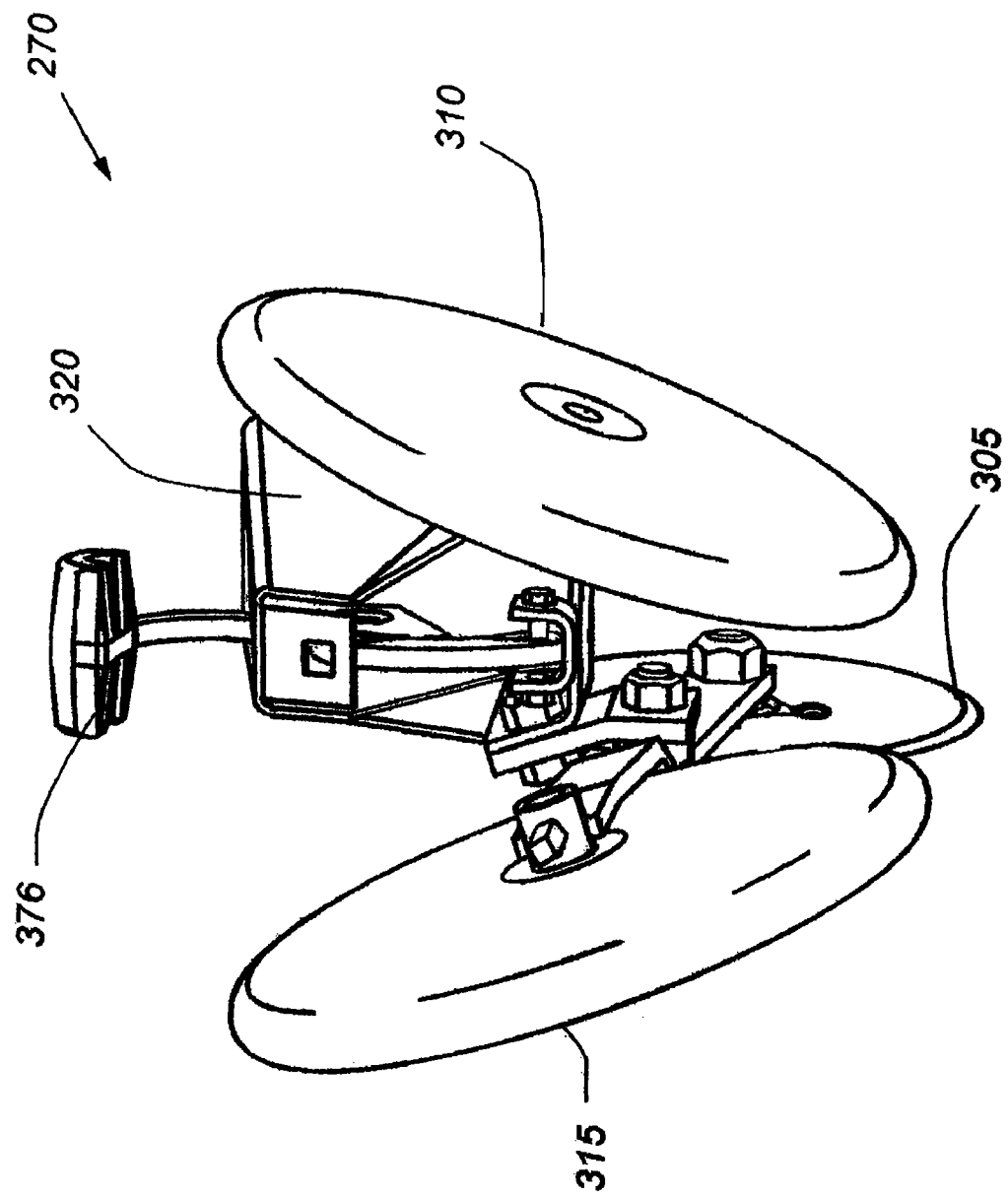
FIG. 14 is another isometric view of the trailing arm assembly of FIG. 12 as viewed from behind and below the trailing arm assembly.

FIGS. 12-17 also depict a similar embodiment of the trailing arm assembly 270, except FIGS. 12-17 are not shown in a field and do not show the liquid fertilizer distribution system. FIG. 12 is generally the same isometric view of the trailing arm depicted in FIG. 11 and, similarly, FIG. 13 is a front isometric view of the trailing arm assembly depicted in FIG. 12. Additionally, FIGS. 11-13 illustrate the trailing arm assembly mounting holes 352, the point at which the trailing arm assembly may attach to the planter main frame. FIG. 14 is another isometric view of the trailing arm assembly of FIG. 12 as viewed from behind and below the trailing arm assembly 270.

Figure 15:
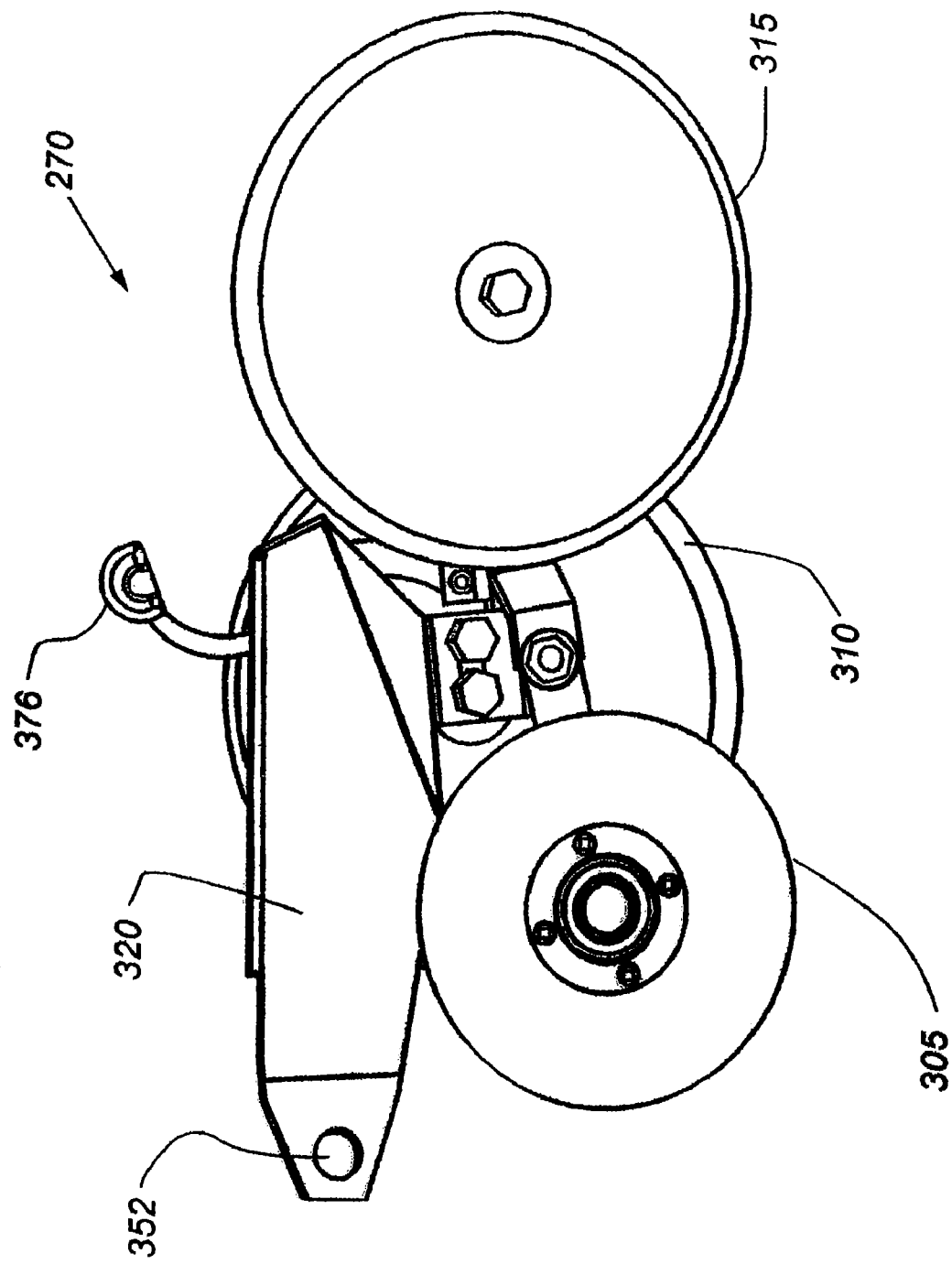
FIG. 15 is a side view of the trailing arm assembly of FIG. 12.
Figure 16:
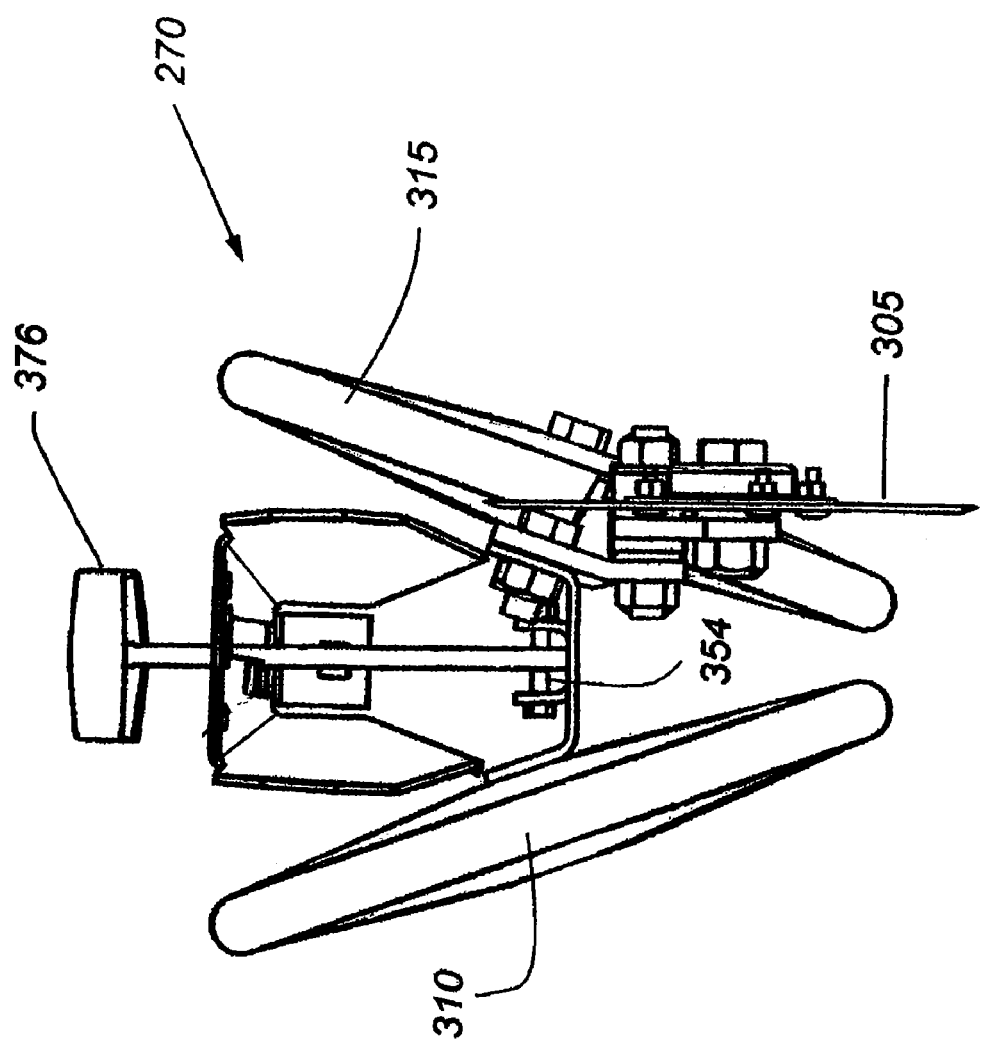
FIG. 16 is a front view of the trailing arm assembly of FIG. 12.
Figure 17:
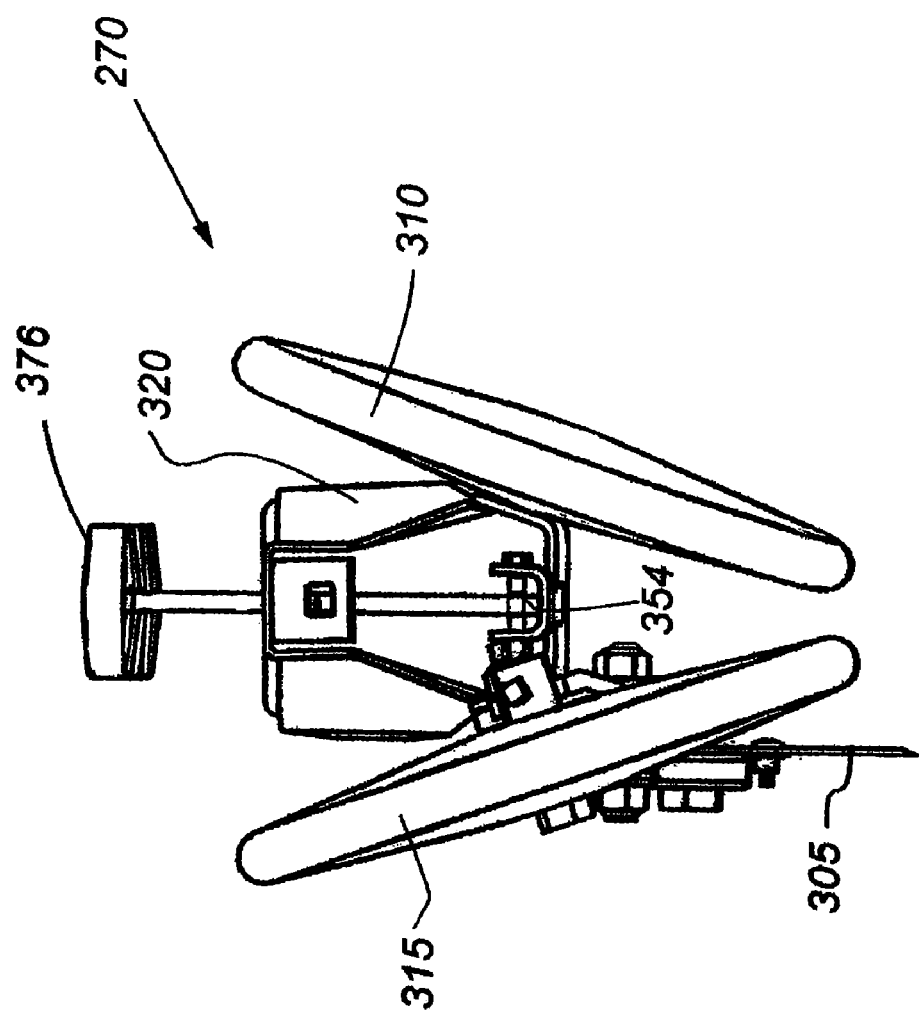
FIG. 17 is a rear view of the trailing arm assembly of FIG. 12.

FIGS. 15-17 also depict different views of the trailing arm assembly of FIG. 12. Similar to FIGS. 11-13, FIG. 15 is a side view of the trailing arm assembly of FIG. 12 and illustrates the trailing arm assembly mounting holes 352, where the trailing arm assembly may attach to the planter main frame. FIG. 16 is a front view of the trailing arm assembly of FIG. 12. The spring, not shown in FIG. 16, but is previously discussed with respect to FIGS. 2 and 7-8, may extend between a bottom end of the lever 376 and the planter main frame 24. Furthermore, the spring may be various types of springs including, but not limited to a coil spring. Additionally, FIG. 17 is a rear view of the trailing arm assembly of FIG. 12. FIG. 17 illustrates an attachment point 354, in which the adjustment lever 376 may attach to the trailing arm assembly.

In other embodiments, the trailing arm assembly 270 includes a screw adjustment feature in place of the lever 376 depicted in FIGS. 2 and 7-8. As is known in the art, the screw adjustment feature can be screwed in or out to adjust a spring arrangement to set the down force on the closing wheels 310, 315.

Regardless of whether a down force is set via a lever arrangement or a screw adjustment arrangement, setting the down force for the maximum amount is not generally an ideal situation for any planter, including the planter disclosed herein. This is because the extreme down force causes an upward force on a planter when the seed boxes get low on seed. This, in turn, causes a planter to ride or plant shallower than when the seed boxes were full of seed. Also, extremely high down force settings can cause closer wheels to act like a trowel in concrete, thereby sealing the soil so tight that the plants have a hard time emerging or plants are crusted under. Such troweling often results in the field having to be replanted or low plant numbers. Reducing the down force eliminates the troweling effect. However, until the arrival of the walking axle assembly 325 disclosed herein, some operators found it necessary in certain field conditions to increase the down force in order to get adequate furrow closure. In any event, the instant invention may work under a variety of down force loads, including no increased down force loads.

As a benefit of the walking axle assembly 325 disclosed herein, the down force on the closer wheels 310, 315 does not have to be set for the maximum down pressure at the lever 376 or screw adjustment feature. Because the fertilizer disc 305 pivots about the axis 340 and the wheel 315 and disc 305 can oscillate, a steady pressure on the closer wheel 315 and disc 305 can be maintained without requiring maxing out the down force via the lever 376 or screw adjustment feature. Thus, the walking axle assembly 325 disclosed herein can provide good furrow closing while reducing the likelihood the seeder is going to lift or troweling will occur.

In one embodiment, the lever 376 or screw adjustment feature can be set to establish down force in the mid-range (e.g., 40 lbs. to 60 lbs.) and still achieve good down force for the closer wheels 310, 315. Such down force settings with the walking axle assembly 325 provides good furrow closing action in firm as well as soft soils.

As can be understood from FIGS. 3 and 7, the seed furrow opener disc 260 opens the seed furrow 280. A seed deposit tube 380, which follows the seed furrow opener disc 260 and extends down into the seed furrow 280, deposits the seed 282 in the seed furrow 280.

As can be understood from FIGS. 2, 3, 7 and 8, the fertilizer furrow opener disc 305 opens the fertilizer furrow 290. The flexible tubing 365 of the fertilizer deposit tube 330, which follows the fertilizer furrow opener disc 305 and extends close to or down into the fertilizer furrow 290, deposits the liquid fertilizer 385 in the fertilizer furrow 290. Depending on the soil firmness, the fertilizer tubing 365 may run on top of the fertilizer furrow or down into the fertilizer furrow. When on top, the fertilizer will filter down into the soil or slice/groove made by the fertilizer disc 305.

While a fertilizer deposit tube 330 employing an arrangement with flexible tubing 365 is depicted in FIGS. 2, 3, 7 and 8 and 11, in other embodiments the fertilizer depositing assembly will have configuration as depicted in FIGS. 18-23. This may be because in some soil conditions the flexible tubing 365 may bounce around. For example, the fertilizer disc 305 may only make a narrow fertilizer furrow in the soil. Consequently, unless the soil is soft, the tubing 365 may not enter into the fertilizer furrow very deep. As the fertilizer comes out of the tubing, it may soak into the soil or be drawn into the moist soil exposed by the disc 305. Sometimes the tubing 365 may bounce around as it encounters field residue or rough ground. This can cause the fertilizer to splatter onto the closer wheels 310, 315, thereby causing soil to build up on the wheels.

To overcome the issues that are sometimes presented by the tubing 365, the embodiment depicted in FIGS. 18-23 may be employed. As shown in FIGS. 18-23, the fertilizer dispensing assembly 500 employs a rebounder assembly 505 including a concave blade or member 510 coupled to the axle 340 in a pivotal and/or biased manner. Thus, the bottom end 515 of the concave member 510 is forced or maintained against the soil surface 300.

Figure 18:
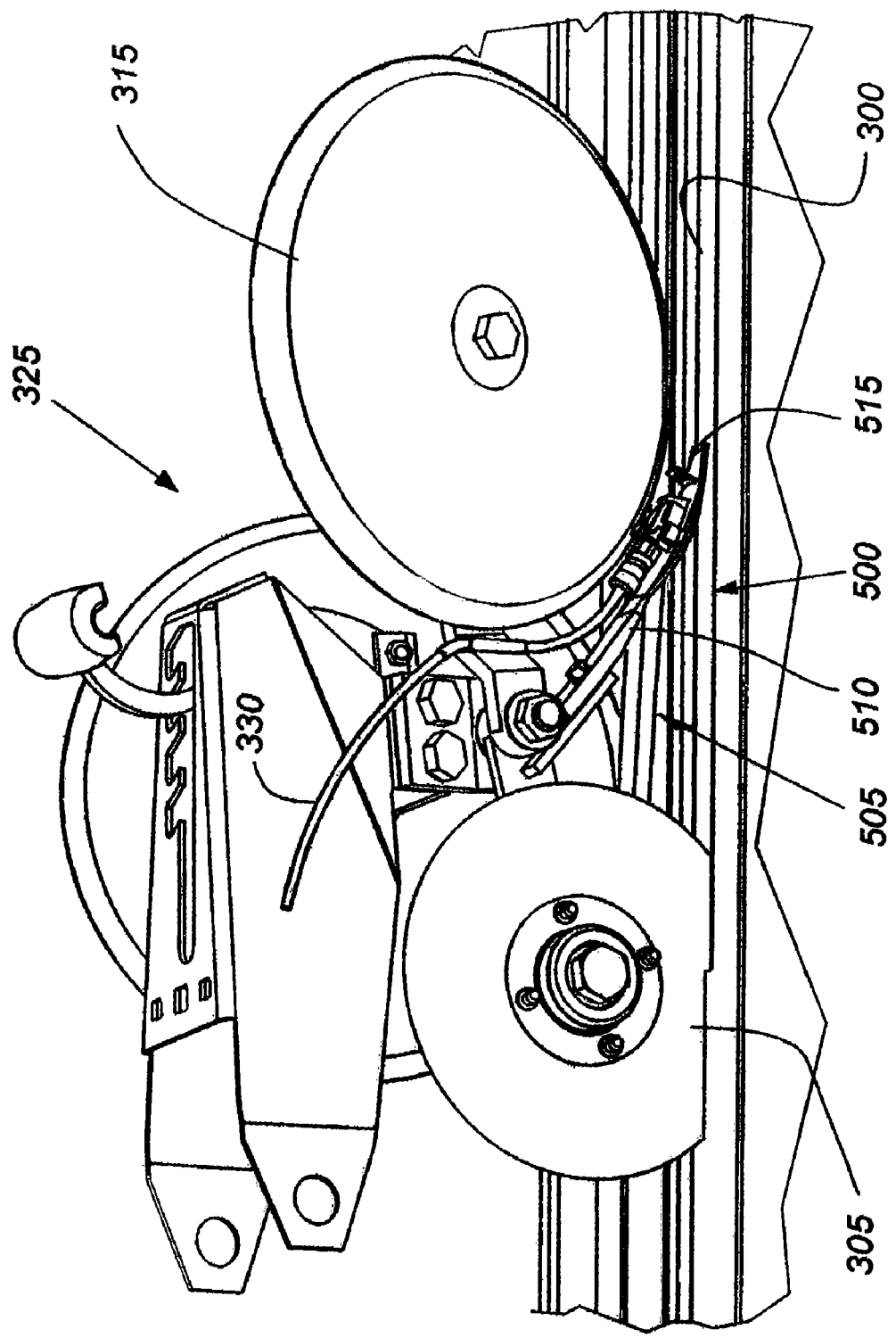
FIG. 18 is an isometric view of the trailing arm assembly of FIG. 12, except employing a rebounder fertilizer assembly.
Figure 19:
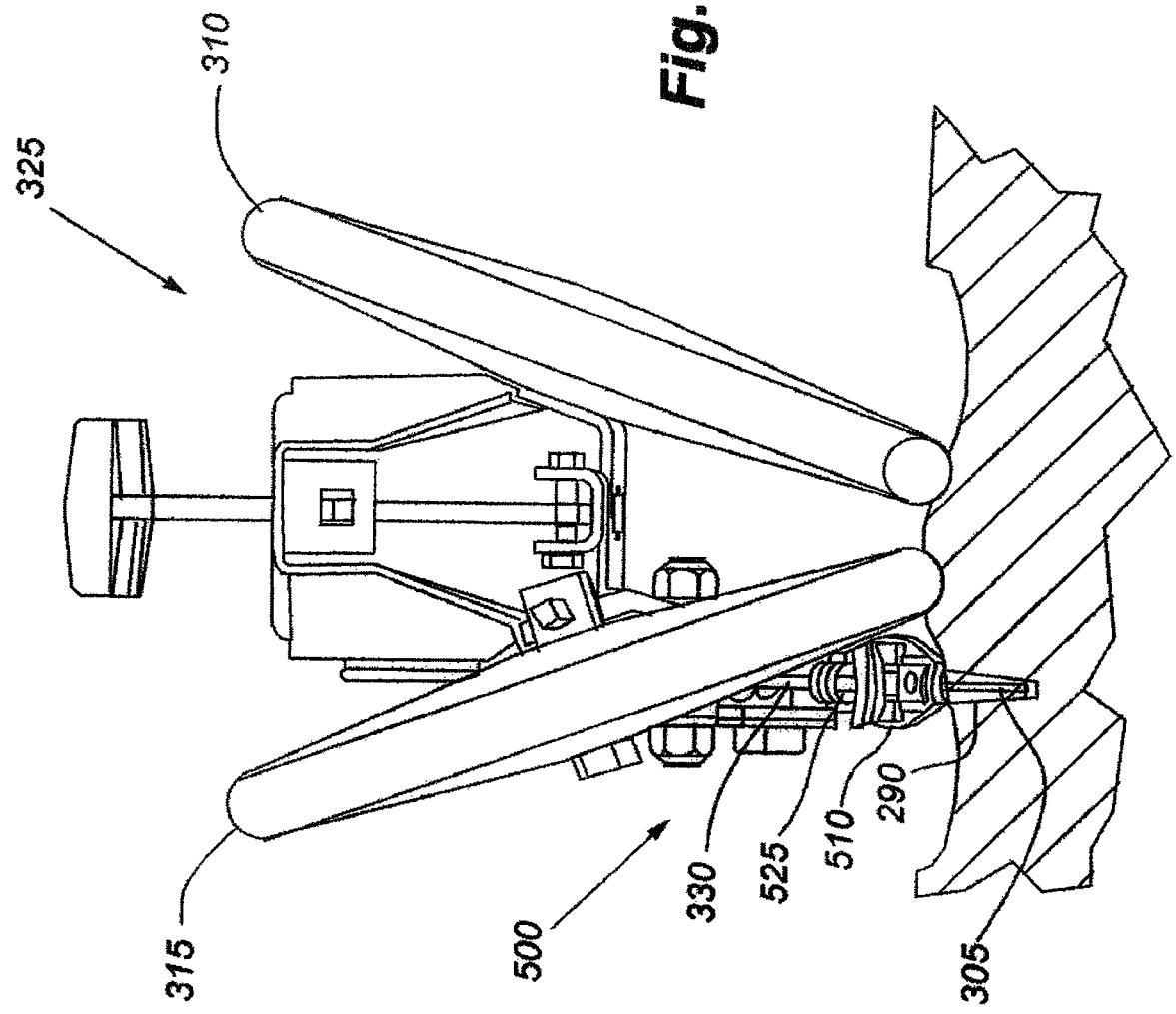
FIG. 19 is a rear view of the trailing arm assembly of FIG. 18.

In one embodiment, the member 510 is flexible and made from a resilient and flexible metal or polymer material. As can be understood from FIGS. 20 and 23, which are, respectively, a side view of the member 510 and a cross section through the member 510 as taken along section line 23-23 in FIG. 20, the member is concave such that the concave surface 530 faces towards the soil surface 300 when used as depicted in FIGS. 18 and 19. The bottom end 515 may be blunt or concave.

As shown in FIGS. 18, 19 and 20, which are, respectively, side and rear view of the lever arm assembly 325 and a side view of the member 510, the deposit tube 330 may be mounted to the walking arm 335 before extending down the rebounder assembly 505 to terminate as a nozzle or end 525. The terms "walking arm" and "lever arm" may be used interchangeably throughout this discussion. As can be understood from FIG. 22, which is an exploded isometric view of the tube 330 and member 510, a hole 520 extends through the member 510 so that, as can be understood from FIGS. 18, 20 and 21, the nozzle 525 passes through or terminates in the hole 520. Accordingly, liquid fertilizer can exit the nozzle, pass through the member 510 and into the fertilizer furrow.

Thus, the fertilizer dispensing assembly 500 is able to place the liquid fertilizer in a straight shot into the fertilizer furrow 290 made by the disc 305. The concave design and flexibility of the member 510 helps to prevent fertilizer from ending up on the closer wheels 310, 315. The member 510 runs over the top of the furrow 290 depositing the fertilizer in the furrow, rather than in other locations that lead to soil buildup on the press wheels.

The fertilizer furrow opener disc 305 may be laterally offset relative to the seed furrow opener disc 260 such that the fertilizer furrow 290 is laterally offset from the seed furrow 280 a distance between approximately one inch and approximately three inches. The lateral offset between the two furrows 280, 290 assists in reducing the likelihood that the fertilizer 385 may burn the seed 282.

As can be understood from FIGS. 2, 3, 7-9, the leading closer wheel 310 partially closes the seed furrow 280, and the trailing closer wheel 315 then completes the full closure of the seed furrow 280. The trailing closer wheel 315 also closes the fertilizer furrow 290 via pressure exerted inward to the seed furrow 280 and outward to the fertilizer furrow 290. The closing wheels 310, 315 running at an angle will put pressure inward toward the seed furrow 280 and also some outward pressure toward the fertilizer furrow 290.

The double discs open up the seed furrow 280, wedging the soil out in to a V and creating side wall compaction. The fertilizer disc 305 will eliminate the side wall compaction resulting from the formation of the seed furrow by the double discs. This make it much easier for the closer wheels 310, 315 to crush the soil around the seed. Such discs can be run on both sides of the seed furrow.

Figure 4:
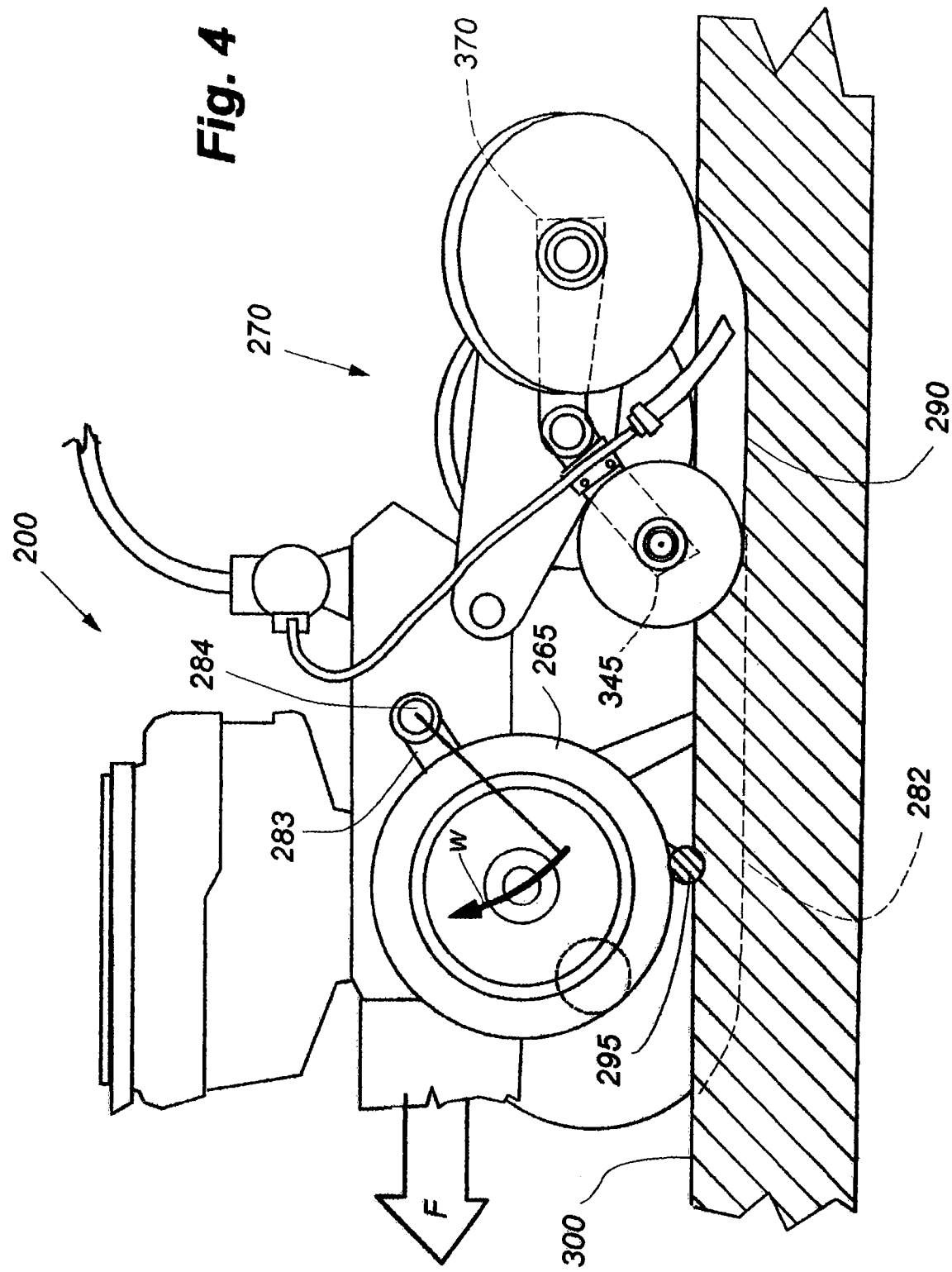

As indicated in FIG. 3, the planter 200 approaches an obstruction 295 (e.g., rock, dirt clod, stubble, branch, ditch, dip, etc.) as the planter 200 travels in the direction of arrow F. As shown in FIG. 4, the gage wheel 265 pivots upwardly in the direction indicated by arrow W via its gage wheel lever arm 283 and relative to the lever arm pivot pin 284 to clear the obstruction 295. Once the gage wheel 265 clears the obstruction 295, the gage wheel 265 returns to contacting the surface 300 as indicated in FIG. 3.

Figure 5:
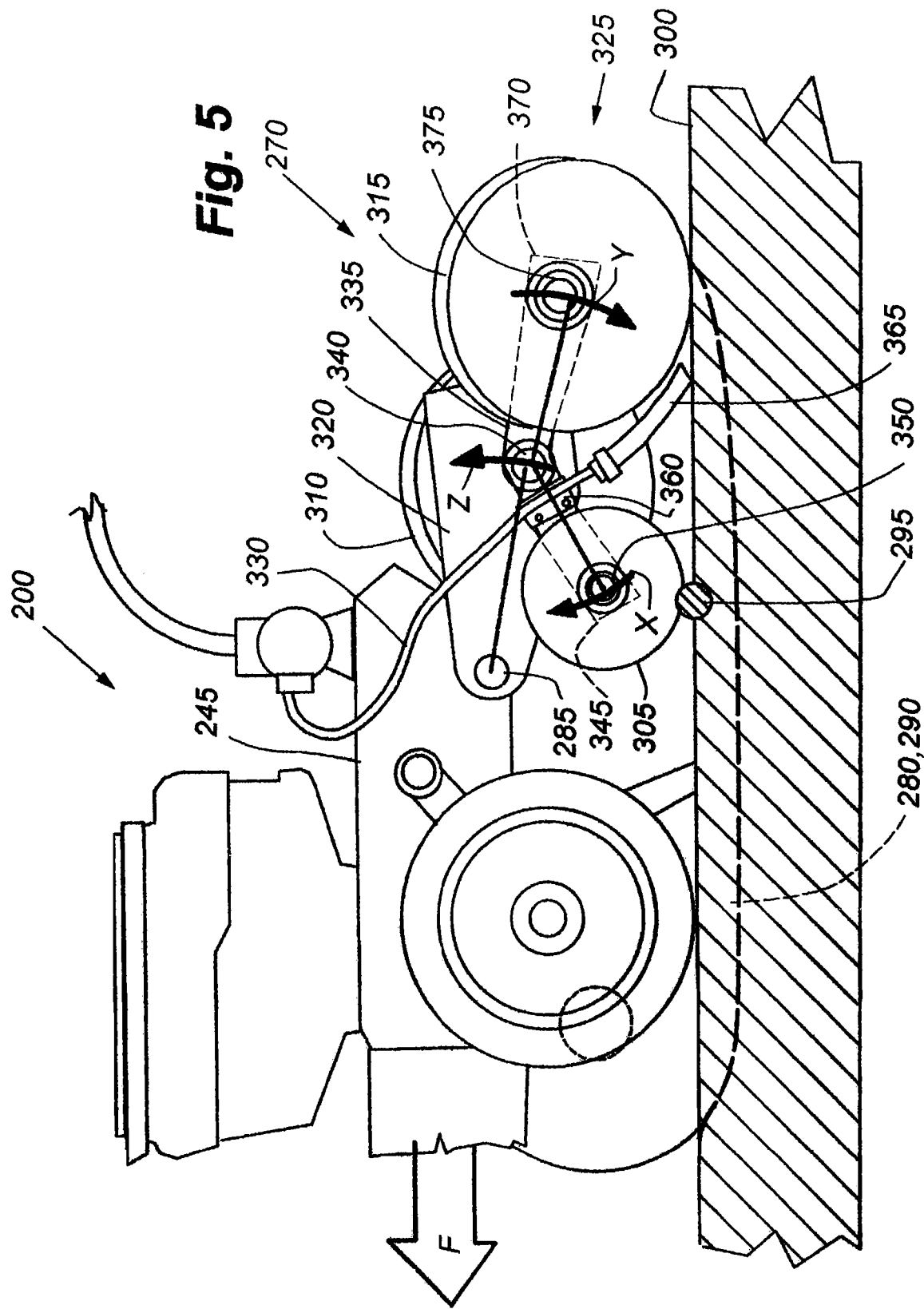

As depicted in FIG. 5, as the planter 200 continues in the direction of arrow F, fertilizer furrow opener disc 305 eventually encounters the obstruction 295. In doing so, the fertilizer furrow opener disc 305 and the leading end 345 of the lever arm 335 on which the disc 305 is mounted are caused to rotate upwardly about the lever arm center pivot pin 340, as indicated by arrow X. The resulting clockwise pivot of the disc 305 about the lever arm center pivot pin 340 causes the trailing closer wheel 315 and trailing end 370 of the lever arm 335 to clockwise pivot about the center pivot pin 340. Thus, the trailing closer wheel 315 presses harder against the field surface 300 as indicated by arrow Y. The downward pressure of the trailing closer wheel 315 coupled with the disc 305 clearing the obstruction 295 causes an upward force on the lever arm center pivot pin 340, which causes the pin 340 and the trailing arm frame 320 to rotate upwardly, as indicated by arrow Z, about the pivot pin 285 attaching the trailing arm frame 320 to the planter frame 245. Due to the trailing arm frame 320 rotating upwardly as indicated by arrow Z, the leading closer wheel 310 also raises upwardly as it travels with the trailing arm frame 320. Due to the lever arm 335 moving upwardly with its pivot pin 340, the bracket 360 moves along with the lever arm 335, which causes the flexible tubing 365 of the fertilizer deposit tube 330 to move upwardly and, perhaps, even temporarily out of the fertilizer furrow, as shown in FIG. 5. Once the disc 305 clears the obstruction 295, the trailing arm frame 320 and lever arm 335 return to normal operation as indicated in FIG. 3. As a result, the disc 305 again creates a furrow 290 in which the flexible tubing 365 again returns.

As illustrated in FIG. 6, as the planter 200 continues in the direction of arrow F, the trailing closer wheel 315 eventually encounters the obstruction 295. In doing so, the wheel 315 and the trailing end 370 of the lever arm 335 on which the wheel 315 is mounted are caused to rotate upwardly about the lever arm center pivot pin 340, as indicated by arrow Y'. The resulting counter clockwise pivot of the wheel 315 about the lever arm center pivot pin 340 causes the fertilizer furrow opener disc 305 and leading end 345 of the lever arm 335 to counter clockwise pivot about the center pivot pin 340. Thus, the disc 305 presses harder against the field surface 300 as indicated by arrow X'. The downward pressure of the disc 305 coupled with the wheel 315 clearing the obstruction 295 causes an upward force on the lever arm center pivot pin 340, which causes the pin 340 and the trailing arm frame 320 to rotate upwardly, as indicated by arrow Z', about the pivot pin 285 attaching the trailing arm frame 320 to the planter frame 245. However, due to the downward rotation of the disc 305 and the leading end 345 of the lever arm 345, the disc 305 may still create a furrow 290 despite the trailing arm frame 320 moving upwardly as indicated by Z'.

Due to the trailing arm frame 320 rotating upwardly as indicated by arrow Z', the leading closer wheel 310 also raises upwardly as it travels with the trailing arm frame 320. Due to the lever arm 335 moving upwardly with its pivot pin 340, the bracket 360 moves along with the lever arm 335, which causes the flexible tubing 365 of the fertilizer deposit tube 330 to move upwardly. However, due to the downward rotation of the disc 305 and the leading end 345 of the lever arm 345, the flexible tubing 365 may still remain in the furrow 290 despite the trailing arm frame 320 moving upwardly as indicated by Z'. Once the wheel 315 clears the obstruction 295, the trailing arm frame 320 and lever arm 335 return to normal operation as indicated in FIG. 3.

As can be understood from FIGS. 3-6, where the leading end length of the lever arm 335 (as measured between the pivots 340, 350) is generally shorter than the trailing end length of the lever arm 335 (as measured between the pivots 340, 375), the displacement of the wheel 315 relative to the trailing arm assembly 270 in an upward direction causes a generally smaller displacement of the disc 305 relative to the trailing arm assembly 270 in a downward direction. For example, the wheel 315 may move upwardly three inches when the disc 305 moves downwardly two inches. Thus, the lever arm arrangement provides a mechanical disadvantage such that an upward force on the wheel 315 creates a greater downward force on the disc 305 to force the disc 305 into hard soil. In one embodiment, the ratio of the leading end length of the lever arm 335 relative to the longer trailing end length of the lever arm 335 is approximately five to approximately seven. In another embodiment, the ratio of the leading end length of the lever arm 335 relative to the longer trailing end length of the lever arm 335 is approximately three to approximately five.

Where the leading end and trailing end lengths of the lever arm 335 are not equal, the displacement of the wheel 315 relative to the trailing arm assembly 270 in an upward direction causes a generally proportional displacement of the disc 305 relative to the trailing arm assembly 270 in a downward direction. In other words, the displacement distances will not be equal to each other, but they will be proportionally related to each other based on the proportional relationship of the respective lengths of the leading and trailing end lengths.

Figure 10:
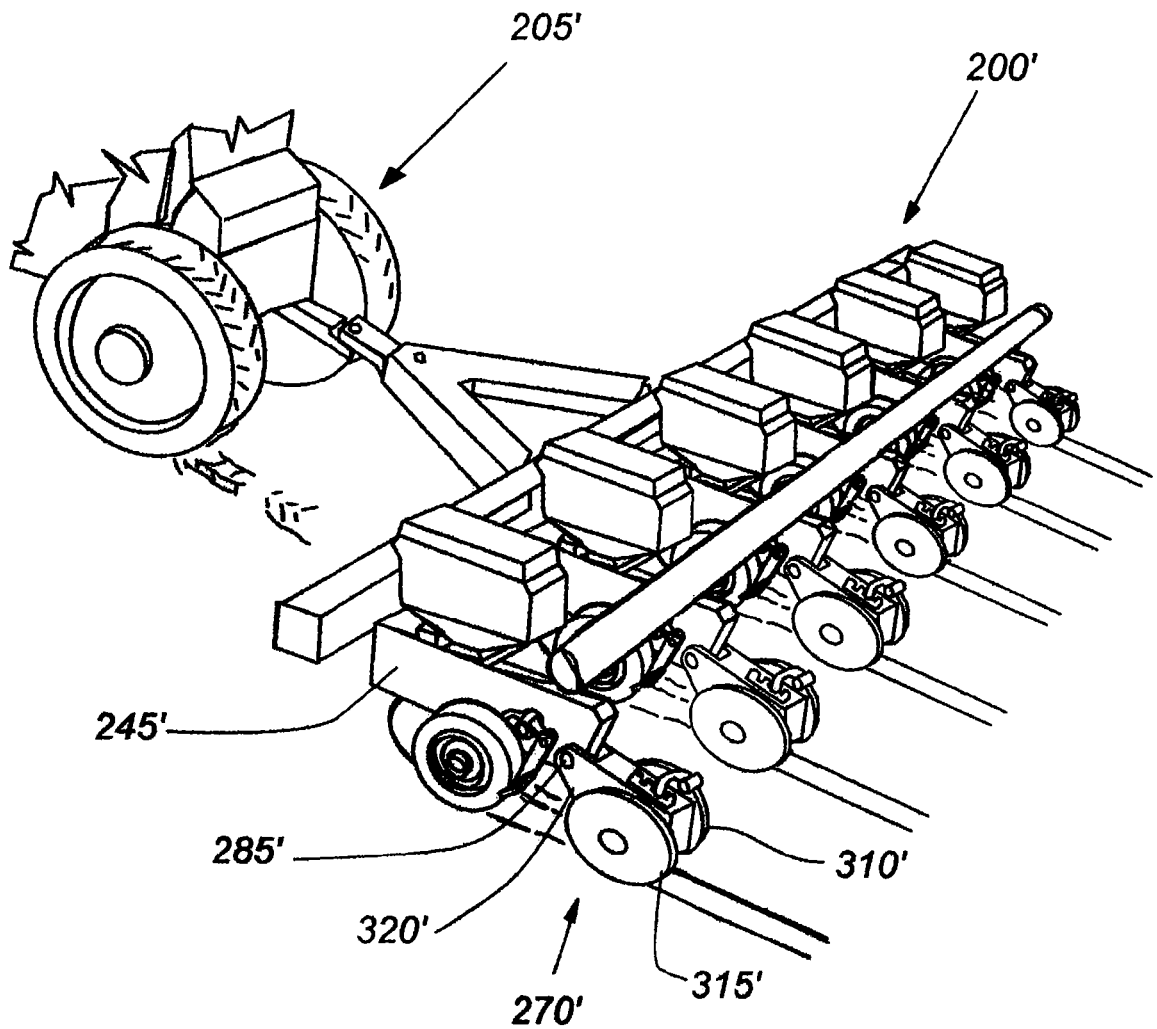
FIG. 10 is the same view as depicted in FIG. 2, except of a planter prior to being retrofitted with the walking axle described with respect to FIGS. 1-9.

In one embodiment, the walking axle 325 may be provided as a package and used to retrofit an existing planter 200' (as shown in FIG. 10) to have a fertilizer or improved fertilizer capability. For a discussion regarding making such a retrofit, reference is made to FIGS. 2 and 10. FIG. 10 is the same view as depicted in FIG. 2, except of a planter 200' prior to being retrofitted with the walking axle 325 described with respect to FIGS. 1-9. For purposes of discussing the retrofit, FIG. 2 represents the planter subsequent to the retrofit.

As shown in FIG. 10, the planter 200' may have a trailing arm assembly 270' pivotally coupled to the frame 245' of the planter 200'. The trailing arm assembly 270' may have two furrow closer wheels 310', 315' that are directly opposite from each other such that their respective axles may be generally aligned with each other or staggered approximately one to two inches. The planter 200' is not equipped for delivering fertilizer, but its owner would like it to be. Instead of purchasing a completely new planter with trailing arm assemblies 270 having walking axle assemblies 325 as discussed with respect to FIGS. 1-9, the owner purchases retrofit packages having the walking axle assemblies 325 and retrofits the existing planter 200' as follows.

As can be understood from FIGS. 2 and 10, for each of the trailing arm assemblies 270', one of the furrow closer wheels 310' is removed and a packaged walking axle assembly 325, as described above with respect to FIGS. 1-9, is mounted near the pivot point of the removed wheel 310'. The walking axle assembly 325, with its furrow opener disc 305, fertilizer tube 365, lever arm 335 and trailing wheel 315, is now able to follow the contours of the field surface 300 while delivering liquid fertilizer.

As can be understood from FIGS. 3-6, in one embodiment, the lever arm assembly 325 may be considered a "walking axle" configuration that allows the disc 305 and trailing closer wheel 315 to walk over an obstruction 295 in the field surface 300. In other words, the configuration of the lever arm assembly 325 allows the disc 305 and wheel 315 to follow the contours of the field surface. Thus, the depth of the fertilizer 385 can be held more constant than previously possible in field surfaces 300 with significant obstructions 295.

The configuration of the lever arm assembly 325 also results in a balance of the downward pressure exerted on the field surface 300 by the disc 305 and wheel 315. More specifically, the configuration of the lever arm assembly 325 assists in keeping downwardly pressure of the disc 305 and wheel 315 generally constant regardless of the obstructions or variation in the field surface 300. This generally balanced and constant downward pressure of the disc 305 and wheel 315 assists in maintaining a constant fertilizer depth, preventing variations in field surface conditions from causing fertilizer depth to become too shallow or too deep.

Figure 25:
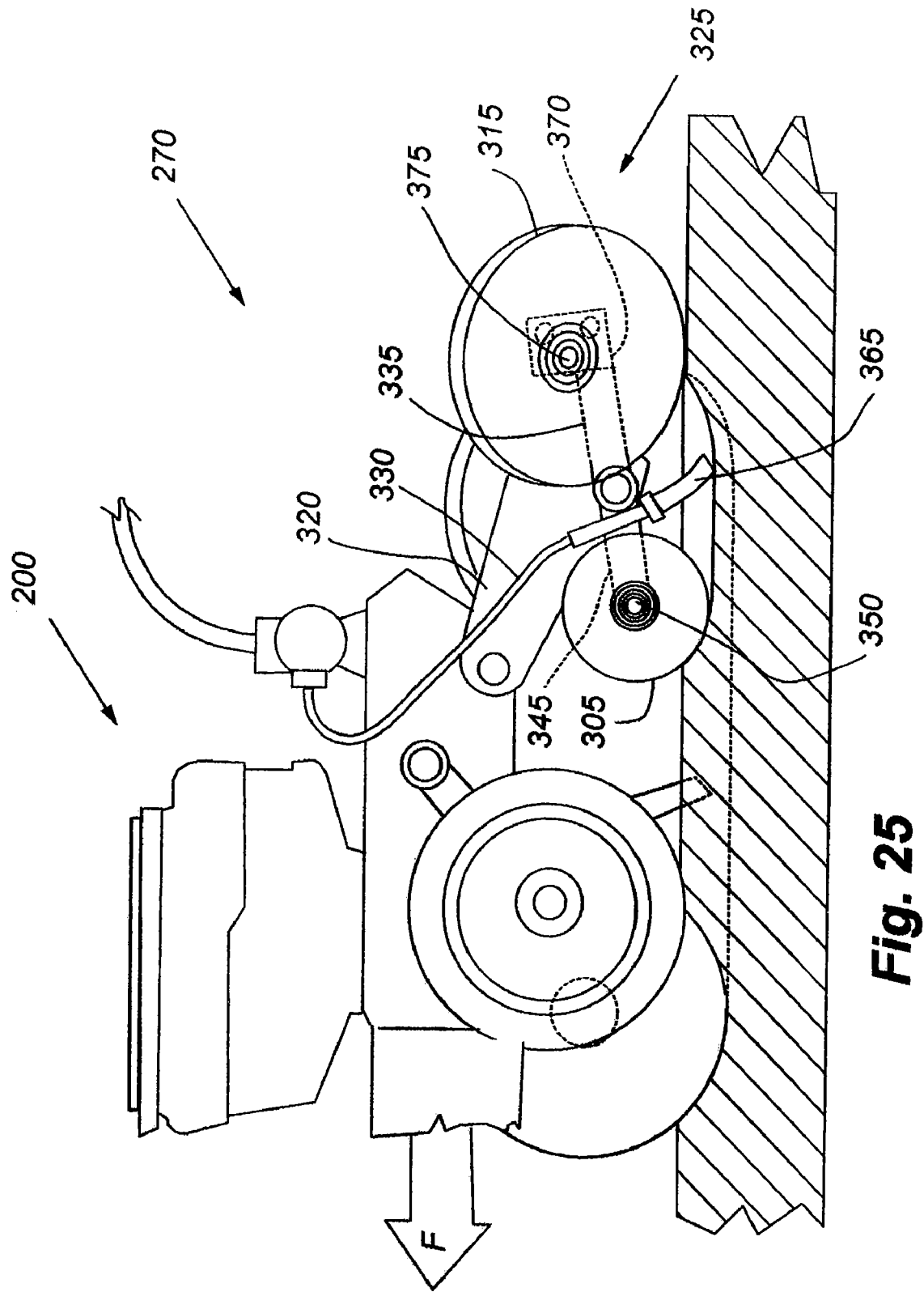
Figure 26:
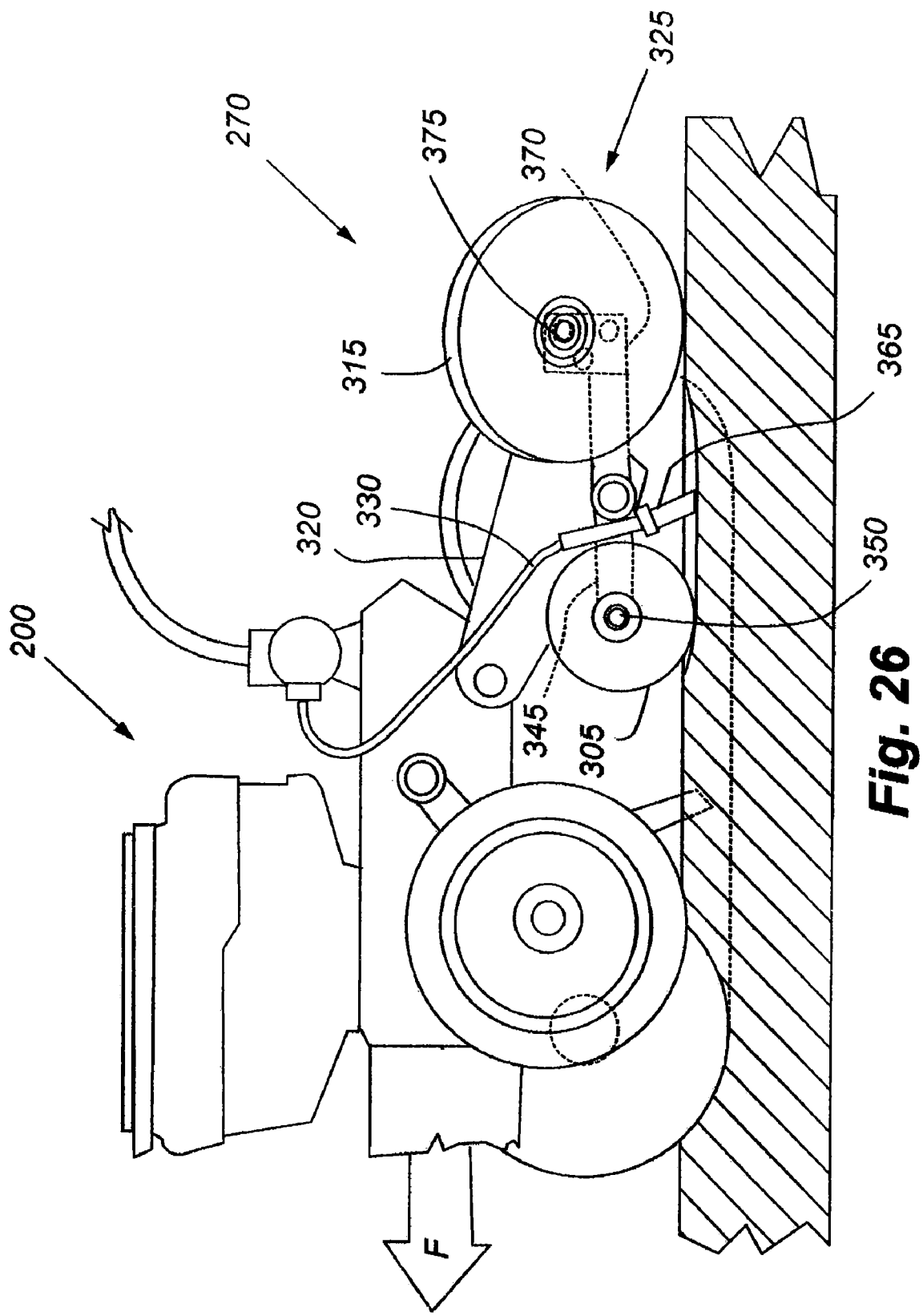
Figure 27:
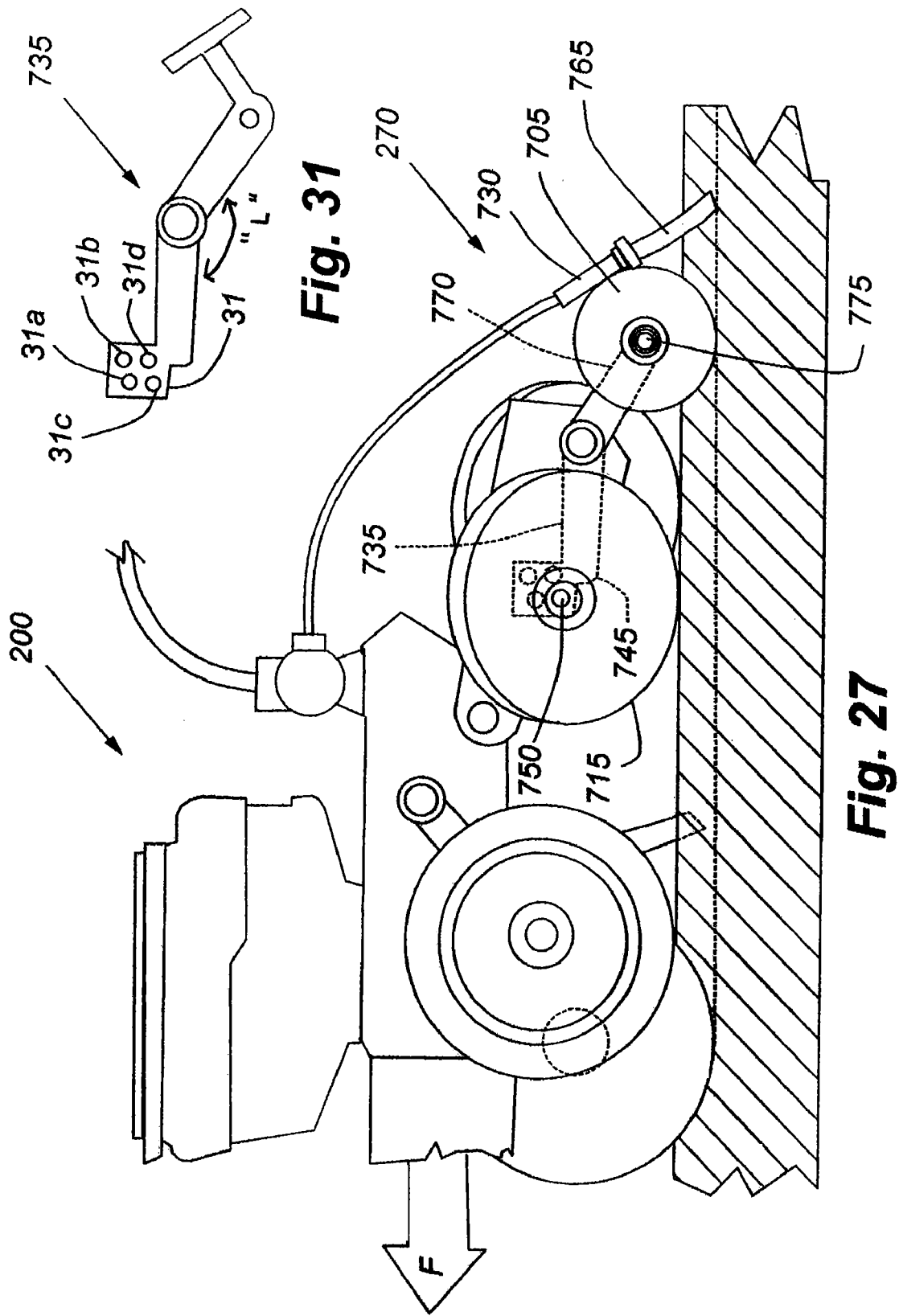
FIGS. 27-29 are the same side views of the planter, each illustrating a different mounting position of the furrow closer wheel with respect to the lever arm.
Figure 28:
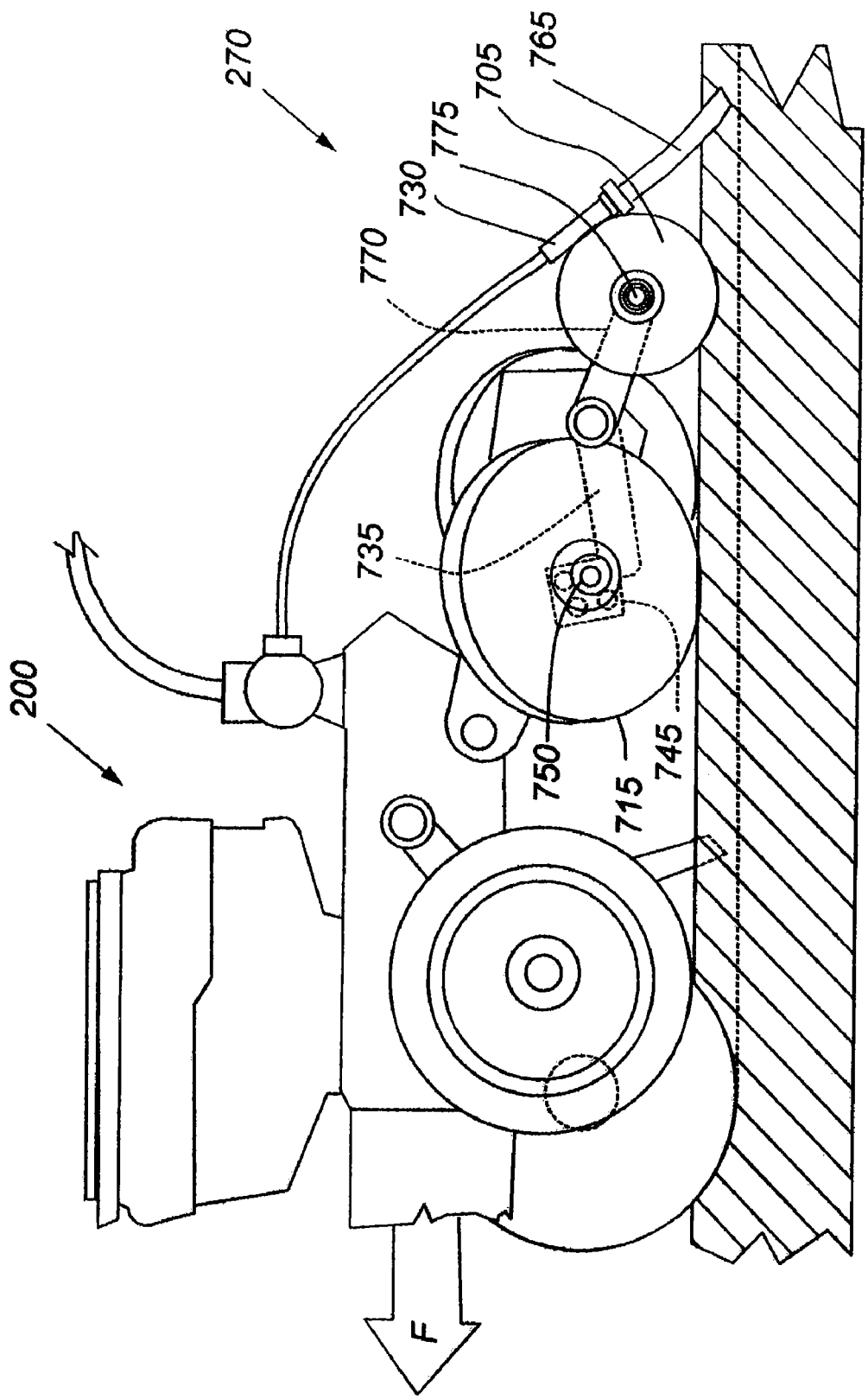
Figure 29:
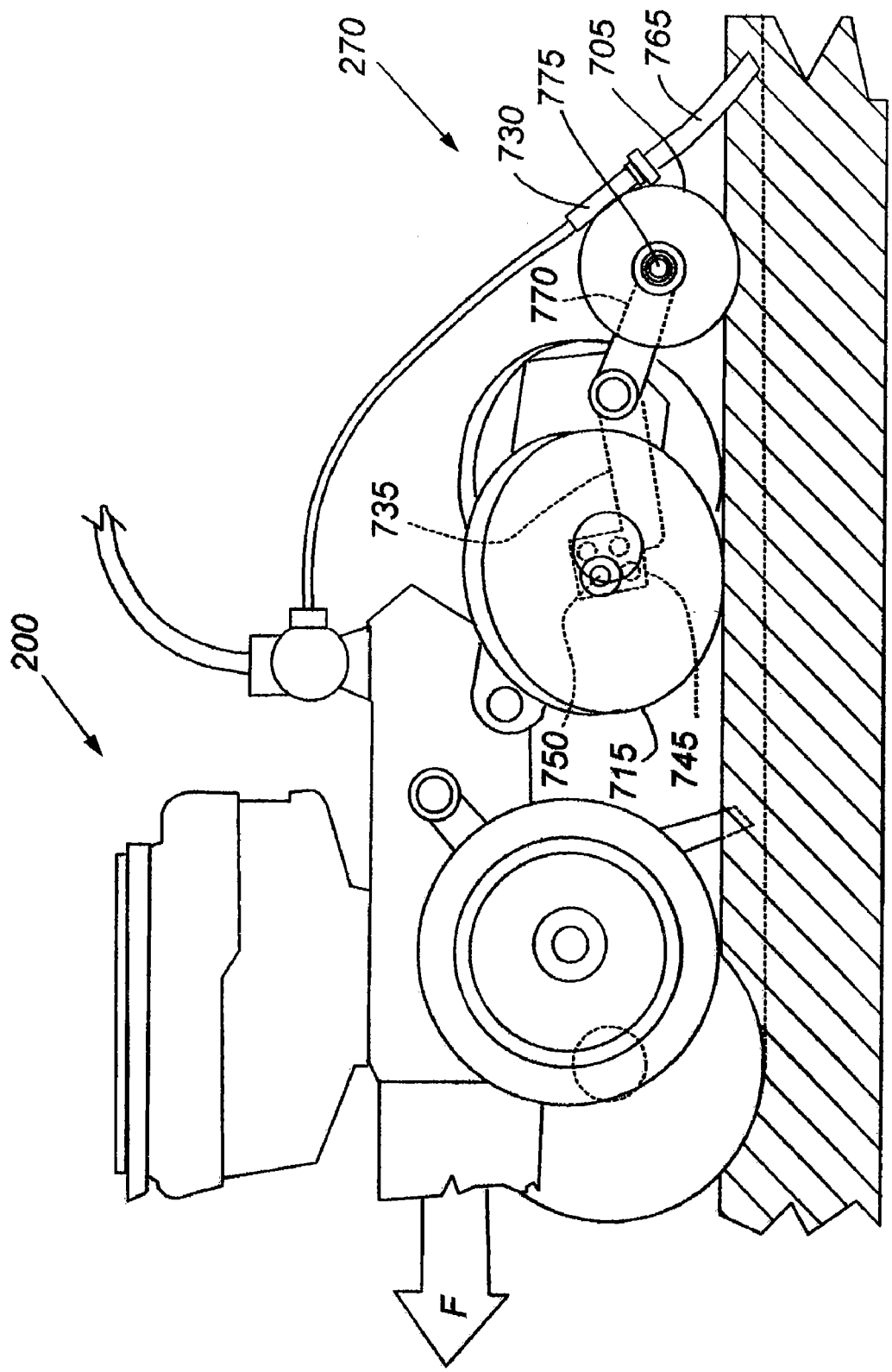

In a further embodiment, FIGS. 24-29 illustrate different configurations of the components of the trailing arm assembly 270. FIGS. 24-26 are the same side views of the planter 200, with each figure illustrating a different mounting position of the trailing furrow closer wheel 315 with respect to the lever arm 335. Further, FIGS. 24-26 illustrate that the trailing furrow closer wheel 315 may pivotally couple to the back or trailing end 370 of the lever arm 335 in any one of three mounting positions. FIGS. 27-29 are the same side views of the planter 200, with each figure illustrating a different mounting position of the furrow closer wheel 715 with respect to the lever arm 735, which includes four mounting positions. Further, FIGS. 27-29 illustrate the furrow closing wheel 715 pivotally mounted at the front or leading end 745 of the lever arm 735 and the furrow opening disc 705 at the back or trailing edge 770 of the lever arm 735. FIGS. 27-29 will be discussed in further detail below.

As depicted in FIGS. 30 and 31, the lever arm 335 may include two distinct segments, a first segment and a second segment, which may be connected at the middle portion of the lever arm 335. As previously discussed and illustrated in FIGS. 3 and 8, the lever arm 335 may pivotally connect to the trailing arm frame 320 via a pivot pin 340 extending through a pivot of the lever arm 335. The first segment and the second segment of the lever arm 335 may be approximately linear with respect to one another (as shown in FIG. 30) or at an angle with respect to one another (as shown in FIG. 31). Further, the first segment and the second segment may be one continuous lever arm, or may be two separate pieces configured to form a lever arm. For example, the first and second segments may be two separate pieces and the first segment may be attached to the second segment at the pivot.

Additionally, the movement of the first segment of the lever arm 335 may be directly related to the movement of the second segment. In one example, as the first segment of the lever arm 335 moves upwardly, the second segment may move downwardly by a proportional distance. In another example, the movement of the first segment of the lever arm 335 may be relative to the movement of the second segment. In this example, the first segment may move upwardly, but there may be some flexibility around the pivot, thus the second segment may move downwardly by a relative distance to the movement of the first segment (as the second segment may be somewhat flexible with respect to the first segment).

In FIG. 30, the back or trailing end 370 of the lever arm 335 may also include, for example, three possible mounting positions where the trailing furrow closer wheel 315 may pivotally couple to the back or trailing end 370 of the lever arm 335. Although three mounting positions are discussed and illustrated herein, this is done for explanatory purposes only. The lever arm 335 may have any number of mounting positions including one, two or more. The lever arm 335 may also include a mounting bracket, where the mounting bracket may include one or multiple mounting positions. As depicted in FIG. 30, the top mounting position 30a may allow the furrow opener disc 305 to run approximately one inch deep with respect to a field surface. The field surface may vary due to obstructions such as debris, clods, stubble and so on, thus the depth of the furrow opener disc 305 may vary depending on the deviations in the field surface. Further, the middle mounting position 30b may allow the furrow opener disc 305 to run approximately one and a half inches deep with respect to the field surface and, as previously discussed, the bottom mounting position 30c may allow the furrow opener disc 305 to run approximately two inches deep in the soil with respect to the field surface.

One embodiment set forth in FIG. 24 illustrates the trailing furrow closer wheel 315 mounted in the bottom mounting position of the back or trailing end 370 of the lever arm 335. In FIG. 24, the trailing furrow closer wheel 315 is also pivotally coupled to the lever arm 335 via a pivot pin 375. By mounting the trailing furrow closer wheel 315 in the bottom mounting position of the lever arm 335, the bottom mounting position on the lever arm 335 may allow the furrow opener disc 305 to run approximately two inches deep in the soil.

Moreover, as depicted in FIG. 24, fertilizer furrow opener disc 305 may be pivotally coupled to the front or leading end 345 of the lever arm 335 via a pivot pin 350. The fertilizer deposit tube 330 may be located in the middle portion of the lever arm 335 and the fertilizer tube 365 may extend downwardly from the fertilizer deposit tube 330.

Similar to FIG. 24, FIGS. 25 and 26 illustrate the trailing furrow closer wheel 315 in different mounting positions on the lever arm 335. For example, FIG. 25 depicts that the trailing furrow closer wheel 315 may be mounted in the approximately middle mounting position of the back or trailing end 370 of the lever arm 335. Similar to FIG. 24, the trailing furrow closer wheel 315 of FIG. 25 may be pivotally coupled to the lever arm 335 via a pivot pin 375. Additionally, FIG. 26 depicts the trailing furrow closer wheel 315 mounted in the top mounting position on the lever arm 335. Also, similar to FIGS. 24 and 25, the trailing furrow closer wheel 315 of FIG. 26 may pivotally couple to the back or trailing end 370 of the lever arm 335.

In a further embodiment illustrated in FIGS. 27-29, the furrow closer wheel 715 may be pivotally coupled to the front or leading end 745 of the lever 735. As depicted in FIGS. 27-29, the front or leading end 745 of the lever 735 includes multiple mounting positions for the furrow closer wheel 715. Also, FIGS. 27-29 are the same side views of the planter 200, with each figure illustrating a different mounting position of the furrow closer wheel 715 with respect to the lever arm 735.

As illustrated in FIGS. 27-29, the furrow opener disc 705 may be pivotally coupled to the back or the trailing end 770 of the lever arm 735. Accordingly, in this embodiment, the furrow closer wheel 715 may be pivotally coupled to the front or leading end 745 of the lever arm 735. Furthermore, the fertilizer deposit tube bracket 730 may be positioned near the back or trailing end 770 of the portion of the lever arm 735, and the fertilizer tube 765 may extend downwardly into and through the fertilizer deposit tube bracket 730, to extend into the furrow. The fertilizer tube may extend into the bracket 730 with a replaceable extension extending from the bracket into the fertilizer furrow. This would allow replacement or repair of only the end portion of the flexible tubing 365 rather than the entire tube. Further, the fertilizer deposit tube may extend downwardly through a fertilizer deposit tube bracket 730 that couples the deposit tube to the lever arm 735 slightly forward of the lever arm center pivot pin, and terminates in a flexible tubing 765, which may be separately replaceable from the rest of the deposit tube. The fertilizer deposit tube may also extend through the flexible tubing 765 and may terminate at approximately the end of the flexible tubing 765. Additionally, the fertilizer deposit tube may extend through the flexible tubing 765 and may terminate at any point within the flexible tubing 765.

Benefits of the lever arm assembly 725 where the furrow opener disc 705 may be mounted to the back or trailing end 770 of the lever arm 735, may include, but are not limited to, less side pressure on the equalizer arm and reducing the likelihood that the furrow opener disc 305 may dive down into loose soils. Further, liquids may not splash onto the planter because the high pressure fertilizer tips or nozzles may be mounted behind the furrow opener disc 705, thus placing the liquid dispersal behind the planter 200. Moreover, due to the reduced fertilizer and/or mud build up on the planter units and wheels, the planter 200 may not dog leg or pull to the side while traveling down the field.

In one embodiment described herein, the fertilizer disc is positioned at the front end of the lever arm and may be more effective in forming a furrow in harder soil, or soil which is untilled. In another embodiment described herein, the fertilizer disc is positioned at the rear end of the lever arm and may be more effective in forming a furrow in softer soil.

As shown in FIG. 27, the furrow opener disc 705 may be rotatably coupled to the back or the trailing end 770 of the lever arm 735 via a pivot pin 775 extending through the lever arm 735 at a mounting position 31c (see FIG. 31). Additionally, the furrow closer wheel 715 may be rotatably coupled to the front or leading end 745 of the lever arm 735 via a pivot pin 750 extending through the lever arm 735. Further, in FIG. 27, the furrow closer wheel 715 may be mounted to any of four mounting positions included on the lever arm 735 (see FIG. 31). Although four mounting positions are discussed and illustrated herein, this is done for explanatory purposes only. The lever arm 735 may include any number of mounting positions including one, two or more.

The multiple mounting positions are formed in the lever arm 735 of FIGS. 27-29 in a mounting bracket. In FIG. 30, three are shown, and as depicted in FIG. 31, the lever arm 735 may have four mounting positions. In FIG. 31, the top mounting position 31a may allow the furrow opener disc 705 to run approximately a half inch deep into the soil with respect to the field surface. Further, the middle mounting position 31b may allow the furrow opener disc 705 to run approximately one inch deep in the soil with respect to the field surface and the mounting position 31d may allow the furrow opener disc 705 to run approximately one and a half inches deep in the soil with respect to the field surface. Also, the bottom mounting position 31c may allow the furrow opener disc 705 to run approximately two inches deep in the soil with respect to the field surface. These one half inch increments are variable depending on the depth desired for the fertilizer furrow. By running the furrow opener disc 705 deeper in the soil, the fertilizer also may be deposited deeper into the soil.

Similar to FIG. 27, in FIGS. 28 and 29, the furrow opener disc 705 may be pivotally coupled to the back or trailing end 770 of the lever arm 735. In FIGS. 28 and 29, the furrow closer wheel 715 may also be pivotally coupled to the front or leading end 745 of the lever arm 735. As depicted in FIG. 28, the furrow closer wheel 715 may be mounted in the mounting position 31d and in FIG. 29, the furrow closer wheel 715 may be mounted in the mounting position 31a on the lever arm 735. Furthermore, the fertilizer deposit tube bracket 730 may be located toward the back or trailing end 770 of the lever arm 735 and the fertilizer tube 765 may extend downwardly from the fertilizer deposit tube 730, as mentioned above.

On occasion, the planter 200 may traverse obstructions in the field. Such obstructions may occur in no-till farming and also may include obstructions such as debris, clods and so on. By locating the furrow opener disc 705 toward the back or trailing end 770 of the lever arm 735, as the planter 200 traverses the field and encounters obstructions, the amount of build up on the furrow opener disc 705 may be minimized. Less build up may occur on the furrow opener disc 705 because as the furrow opener disc 705 is pulled over obstructions, it may upwardly rotate about the pivot. The furrow opener disc 305 will also not likely burrow down into the soil when an obstacle is encountered. Since it is being pulled, and not pushed, the disc 705 should move over the obstacle more easily.

Figure 32:
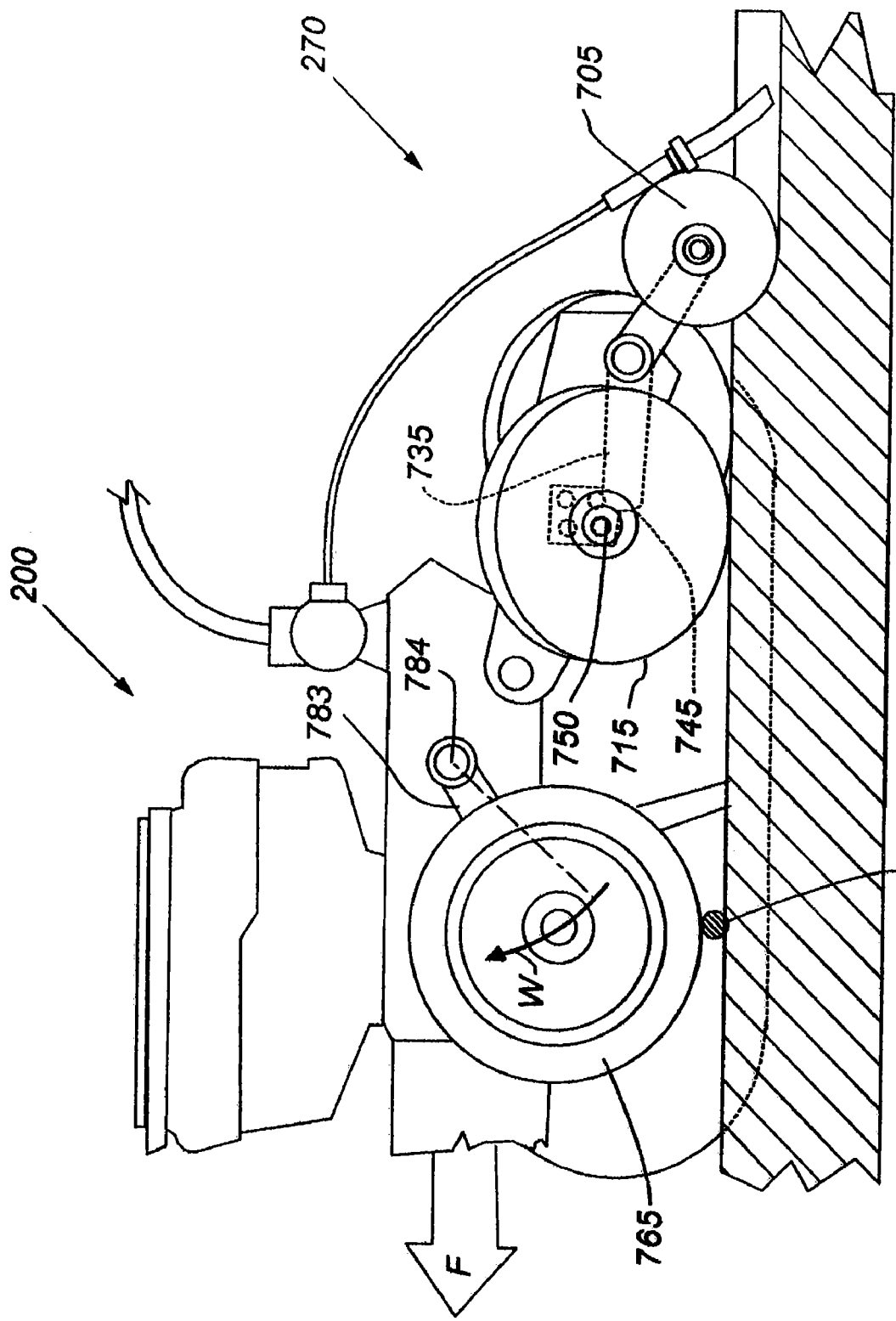
FIGS. 32-34 are the same side views of the planter, each illustrating a different state of the gage wheel and components of the trailing arm assembly as the planter passes over an obstruction in the field surface.
Figure 33:
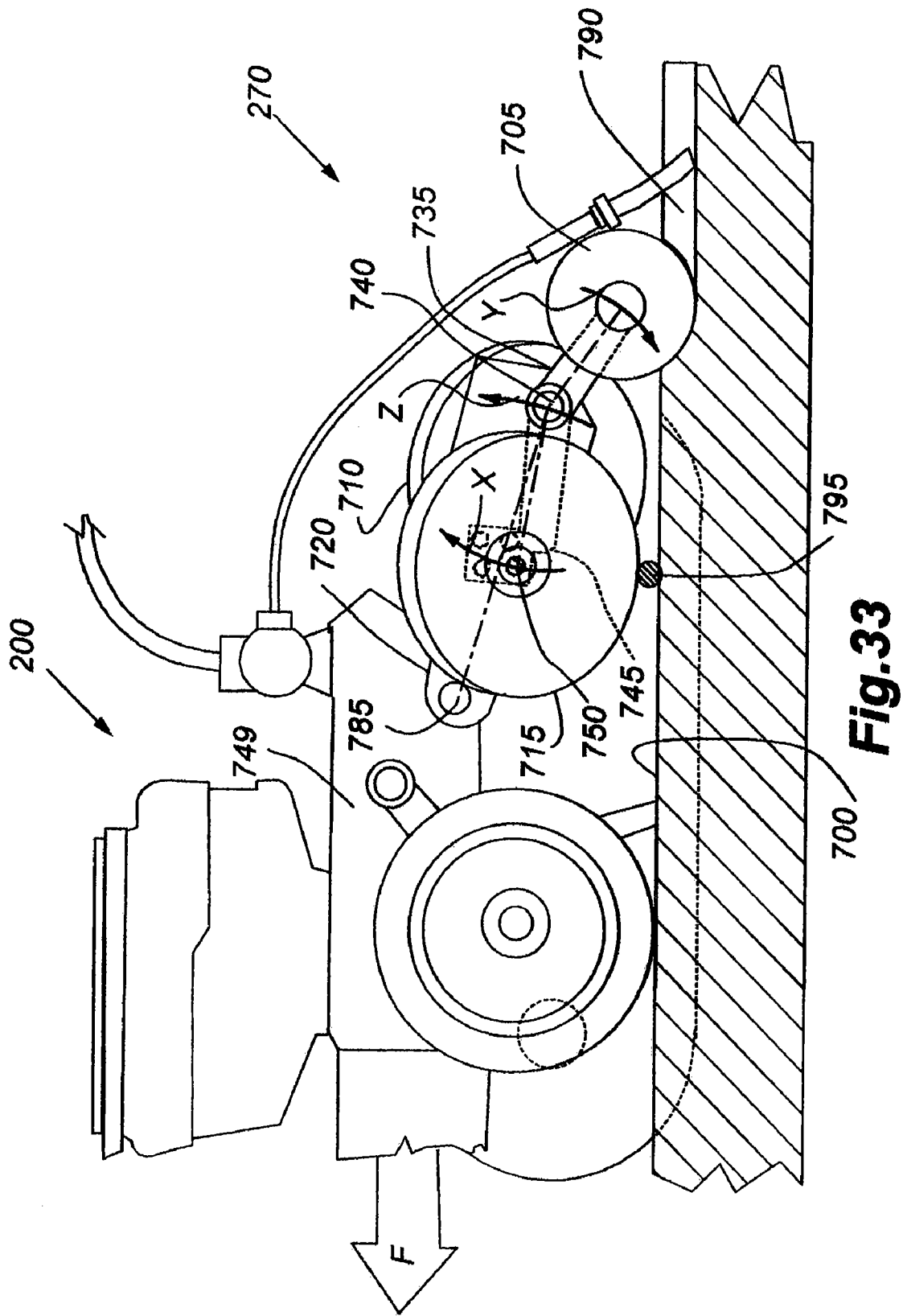
Figure 34:
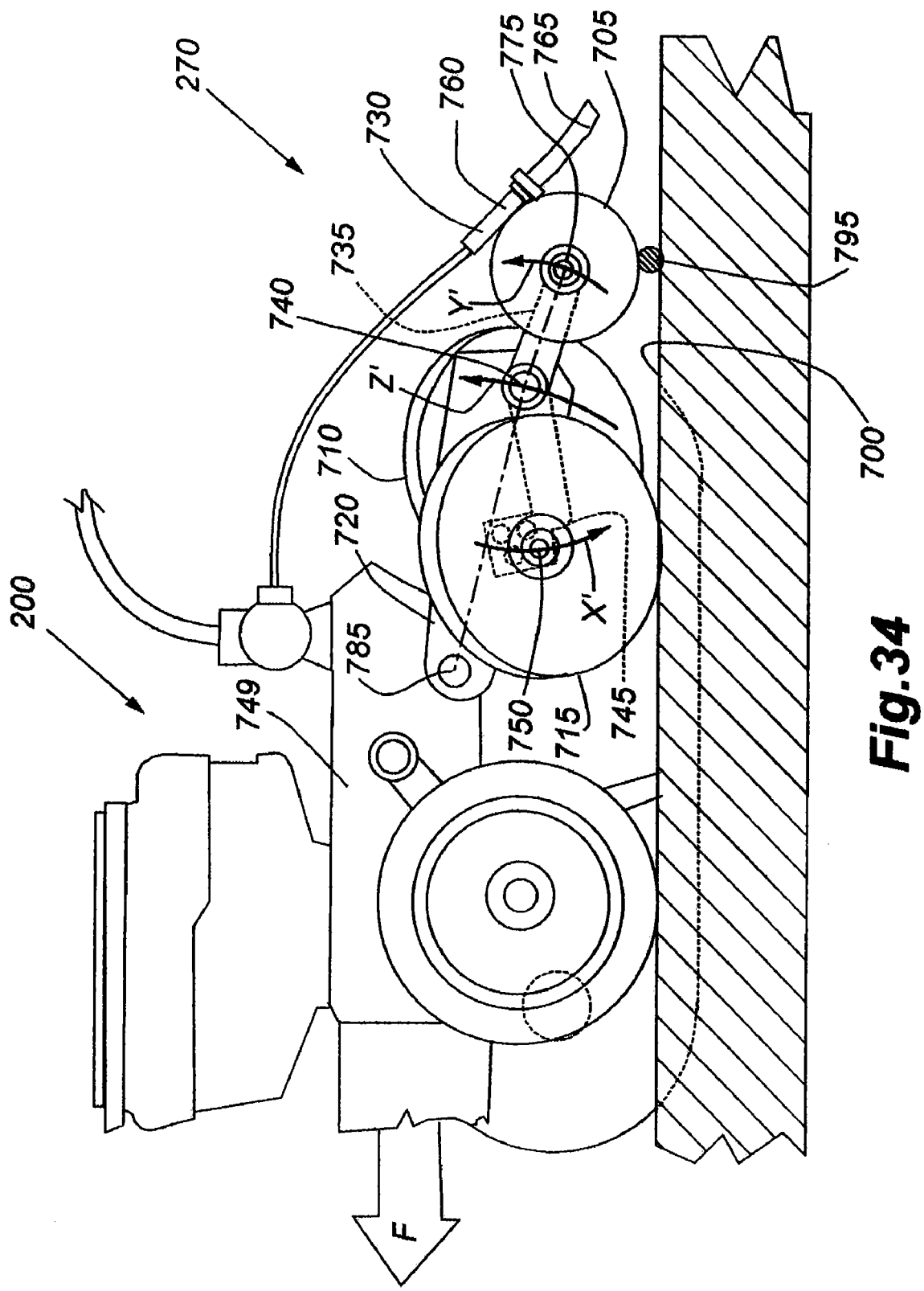

As indicated in FIGS. 32-34, the planter 200 approaches an obstruction 795, the gage wheel 765 may pivot upwardly in the direction indicated by arrow W via its lever arm 783 and relative to the lever arm pivot pin 784 to clear the obstruction 795. FIGS. 32-34 depict a similar example as previously discussed FIGS. 4-6. Thus, the progression of the furrow closer wheel 715 and the furrow opener disc 705 of FIGS. 32-34 is also similar to the previous discussion of FIGS. 4-6.

Similar to FIG. 5, the planter 200 of FIG. 33 continues in the direction of arrow F and furrow closer wheel 715 eventually encounters the obstruction 795. As the furrow closer wheel 715 travels over the obstruction 795, the planter 200 may move upwardly in two ways. First, the trailing arm frame 720 may rotate upwardly about the pivot pin 785, thus causing the entire lever arm 735, including the lever arm center pivot pin 740, to also move upwardly in the Z direction. Second, the furrow closer wheel 715 and the furrow opener disc 705 may rotate about the center pivot pin 740.

Further to the second way, the furrow closer wheel 715 and the front or leading end 745 of the lever arm 735 on which the furrow closer wheel 715 is mounted are caused to rotate upwardly about the lever arm center pivot pin 740, as indicated by arrow X. The resulting clockwise pivot of the furrow closer wheel 715 about the lever arm center pivot pin 740 causes the furrow opener disc 705 and back or trailing end 770 of the lever arm 735 to clockwise pivot about the center pivot pin 740. Thus, the furrow opener disc 705 presses harder against the field surface 700 as indicated by arrow Y and possibly forming a deeper fertilizer furrow. The downward pressure of the furrow opener disc 705 coupled with the furrow closer wheel 715 clearing the obstruction 795 causes an upward force on the lever arm center pivot pin 740, which causes the pin 740 and the trailing arm frame 720 to rotate upwardly, as indicated by arrow Z, about the pivot pin 785 attaching the trailing arm frame 720 to the planter frame 749. Due to the trailing arm frame 720 rotating upwardly as indicated by arrow Z, the closer wheel 710 also raises upwardly as it travels with the trailing arm frame 720. Once the furrow closer wheel 715 clears the obstruction 795, the trailing arm frame 720 and lever arm 735 return to normal operation as indicated in FIG. 27. However, due to the downward rotation of the furrow closer wheel 715 and the front or leading end 745 of the lever arm 735, the furrow opener disc 705 may still create a furrow 790 despite the trailing arm frame 720 moving upwardly as indicated by Z.

As illustrated in FIG. 34 (and similar to FIG. 6), as the planter 200 continues in the direction of arrow F, the furrow opener disc 705 eventually encounters the obstruction 795. In doing so, the furrow opener disc 705 and the back or trailing end 770 of the lever arm 735 on which the furrow opener disc 705 is mounted may be caused to rotate upwardly about the lever arm center pivot pin 740, as indicated by arrow Y'. The resulting counter clockwise pivot of the furrow opener disc 705 about the lever arm center pivot pin 740 causes the furrow closer wheel 715 and leading end 745 of the lever arm 735 to counter clockwise pivot about the center pivot pin 740. Thus, the furrow closer wheel 715 presses harder against the field surface 700 as indicated by arrow X'. The downward pressure of the furrow closer wheel 715 coupled with the furrow opener disc 705 clearing the obstruction 295 causes an upward force on the lever arm center pivot pin 740, which causes the pin 740 and the trailing arm frame 720 to rotate upwardly, as indicated by arrow Z', about the pivot pin 785 attaching the trailing arm frame 720 to the planter frame 749.

Due to the trailing arm frame 720 rotating upwardly as indicated by arrow Z' about the pivot pin 785, the furrow closer wheel 710 also raises upwardly as it travels with the trailing arm frame 720. Due to the lever arm 735 moving upwardly with its pivot pin 740, the bracket 760 moves along with the lever arm 735, which causes the flexible tubing 765 of the fertilizer deposit tube 730 to move upwardly. Once the furrow opener disc 705 clears the obstruction 795, the trailing arm frame 720 and lever arm 735 return to normal operation as indicated in FIG. 27. In clearing the obstacle, the opener disc 705 may or may not disengage from the soil. Since it is being pulled, and not pushed, it is less likely to burrow down into the soil.

As can be understood from FIGS. 32-34, where the leading end length of the lever arm 735 (as measured between the pivots 740, 750) is generally shorter than the trailing end length of the lever arm 735 (as measured between the pivots 740, 775), the displacement of the furrow opener disc 705 relative to the trailing arm assembly 270 in an upward direction causes a generally smaller displacement of the furrow closer wheel 715 relative to the trailing arm assembly 270 in a downward direction. For example, the furrow opener disc 705 may move upwardly three inches when the furrow closer wheel 715 moves downwardly two inches. Thus, the lever arm arrangement provides a mechanical disadvantage such that an upward force on the furrow opener disc 705 creates a greater downward force on the furrow closer wheel 715 to force the furrow closer wheel 715 into hard soil.

In one embodiment, the ratio of the leading end length of the lever arm 735 relative to the shorter trailing end length of the lever arm 735 is approximately seven to approximately five. In another embodiment, the ratio of the leading end length of the lever arm 735 relative to the shorter trailing end length of the lever arm 735 is approximately five to approximately three. Additionally, as illustrated in FIG. 31, the first segment and the second segment of lever arm 735 may form an angle such that the furrow opener disc 705 may be positioned relatively lower than the closer wheel with respect to the field surface to form a fertilizer furrow 790 in the soil. The lesser the angle "L" of FIG. 31, between the first segment and the second segment of the lever arm 735, the lower the furrow opener disc 705 may be positioned with respect to the furrow closer wheel 715. Moreover, the furrow opener disc 705 may leave a deeper fertilizer furrow 790 as the angle between the first and second segment of the lever arm 735 decreases.

Where the leading end and trailing end lengths of the lever arm 735 are not equal, the displacement of the furrow opener disc 705 relative to the trailing arm assembly 270 in an upward direction causes a generally proportional displacement of the furrow closer wheel 715 relative to the trailing arm assembly 270 in a downward direction. In other words, the displacement distances will not be equal to each other, but they will be proportionally related to each other based on the proportional relationship of the respective lengths of the leading and trailing end lengths.

All directional references (e.g., upper, lower, upward, downward, left, right, leftward, rightward, top, bottom, above, below, inner, outer, vertical, horizontal, clockwise, and counterclockwise) are only used for identification purposes to aid the reader's understanding of the examples of the invention, and do not create limitations, particularly as to the position, orientation, or use of the invention unless specifically set forth in the claims. Joinder references (e.g., attached, coupled, connected, joined, and the like) are to be construed broadly and may include intermediate members between a connection of elements and relative movement between elements. As such, joinder references do not necessarily infer that two elements are directly connected and/or in fixed relation to each other.

In some instances, components are described with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like.

In methodologies directly or indirectly set forth herein, various steps and operations are described in one possible order of operation, but those skilled in the art will recognize that steps and operations may be rearranged, replaced, or eliminated or have other steps inserted without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with respect to particular apparatuses, configurations, components, systems and methods of operation, it will be appreciated by those of ordinary skill in the art upon reading this disclosure that certain changes or modifications to the embodiments and/or their operations, as described herein, may be made without departing from the spirit or scope of the invention. Accordingly, the proper scope of the invention is defined by the appended claims. The various embodiments, operations, components and configurations disclosed herein are generally exemplary rather than limiting in scope.

What is claimed is:

1. An agriculture planter comprising:
   a planter frame;
   a trailing arm assembly vertically pivotally coupled to a trailing side of the planter frame;
   a rotatable furrow opening disc operably coupled to the trailing arm assembly; and
   a first rotatable furrow closing wheel operably coupled to the to trailing arm assembly, wherein displacement of the first wheel relative to the trailing arm assembly causes displacement of the disc relative to the trailing arm assembly.

2. The planter of claim 1, wherein displacement of the first wheel relative to the trailing arm assembly in an upward direction causes displacement of the disc relative to the trailing arm assembly in a downward direction.

3. The planter of claim 2, wherein the displacement of the first wheel relative to the trailing arm assembly is generally greater than the displacement of the disc relative to the trailing arm assembly.

4. The planter of claim 2, wherein the displacement of the first wheel relative to the trailing arm assembly is not equal to, but is proportional to, the displacement of the disc relative to the trailing arm assembly.

5. The planter of claim 2, wherein displacement of the first wheel relative to the trailing arm assembly in a clockwise direction causes displacement of the disc relative to the trailing arm assembly in a clockwise direction.

6. The planter of claim 1, wherein the trailing arm assembly further includes a second rotatable furrow-closing wheel.

7. The planter of claim 6, wherein the second wheel is on an opposite side of the trailing arm assembly from the first wheel.

8. The planter of claim 1, further comprising a lever arm pivotably coupled to the trailing arm assembly and operably coupling the disc and first wheel to each other.

9. The agricultural planter of claim 8, wherein at least one end of the lever arm includes a plurality of mounting positions.

10. The planter of claim 1, further comprising a fertilizer distribution tube operably coupled to the disc.

11. The agricultural planter of claim 1 further comprising a lever arm including at least a leading end, a middle portion and a trailing end, wherein a plurality of mounting positions are located on the leading end of the lever arm.

\* \* \* \* \*